United States Patent
Lozhkin

(10) Patent No.: US 9,838,137 B2
(45) Date of Patent: Dec. 5, 2017

(54) DEVICE AND METHOD FOR TRANSMITTING OPTICAL SIGNAL IN WHICH A PLURALITY OF SIGNALS ARE MULTIPLEXED

(71) Applicant: FUJITSU LIMITED, Kawasaki-shi, Kanagawa (JP)

(72) Inventor: Alexander Nikolaevich Lozhkin, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 15/274,854

(22) Filed: Sep. 23, 2016

(65) Prior Publication Data
US 2017/0180053 A1  Jun. 22, 2017

(30) Foreign Application Priority Data

Dec. 18, 2015 (JP) ................. 2015-247979
Aug. 8, 2016 (JP) ................. 2016-155207

(51) Int. Cl.
H04J 14/00 (2006.01)
H04B 10/564 (2013.01)
H04B 10/2575 (2013.01)

(52) U.S. Cl.
CPC ..... H04B 10/564 (2013.01); H04B 10/25753 (2013.01)

(58) Field of Classification Search
CPC ............ H04B 10/564; H04B 10/25753; H04B 10/697; H04B 10/2575; H04B 10/25752;
(Continued)

(56) References Cited

U.S. PATENT DOCUMENTS 5,315,583 A * 5/1994 Murphy ................. H04H 20/31
370/312
7,206,520 B2 * 4/2007 Way ....................... H04B 10/50
398/183
(Continued)

FOREIGN PATENT DOCUMENTS

JP   2001-237800 A   8/2001
JP   2006-005390 A   1/2006
(Continued)

OTHER PUBLICATIONS

Cox et al., Limits on the Performance of RF-Over-Fiber Links and Their Impact on Device Design, Transactions on Microwave Theory and Techniques, Feb. 2006, pp. 906-920, vol. 54, No. 2.
(Continued)

Primary Examiner — Hibret Woldekidan
(74) Attorney, Agent, or Firm — Arent Fox LLP

(57) ABSTRACT

A communication device includes: a signal generator configured to generate a plurality of intermediate frequency signals; a combiner configured to combine the plurality of intermediate frequency signals to generate a multichannel signal; a reduction unit configured to reduce a peak-to-average power ratio of the multichannel signal; and a converter configured to convert the multichannel signal whose peak-to-average power ratio is reduced by the reduction unit into an optical signal. The reduction unit reduces a power of the multichannel signal using supplemental signals, frequencies of the supplemental signals being different from frequencies of the intermediate frequency signals, when the power of the multichannel signal is higher than a specified threshold level.

10 Claims, 19 Drawing Sheets

(58) Field of Classification Search
CPC . H04B 10/40; H04L 27/2096; H04L 27/2657; H04L 25/022; H04L 5/0053; H04L 27/2601; H04L 27/2623; H04L 5/0023; H04L 5/00485
USPC ... 398/43, 74, 115, 116, 135, 136, 158, 159, 398/69, 187
See application file for complete search history.

(56) References Cited

U.S. PATENT DOCUMENTS

| | | | |
|---|---|---|---|
| 7,209,660 B1* | 4/2007 | Yee | H04B 10/50 398/141 |
| 7,343,015 B2* | 3/2008 | Lam | H03F 3/68 381/14 |
| 8,260,143 B2* | 9/2012 | Gupta | H04L 27/2096 398/115 |
| 8,260,144 B2* | 9/2012 | Gupta | H04L 27/2096 398/115 |
| 8,380,144 B1* | 2/2013 | Bai | H03F 1/3247 375/296 |
| 8,787,873 B1* | 7/2014 | Hitt | H04W 8/20 455/406 |
| 9,008,512 B2* | 4/2015 | Nazarathy | H04B 10/272 398/65 |
| 9,020,362 B2* | 4/2015 | Gupta | H04L 27/2096 398/193 |
| 9,037,107 B2* | 5/2015 | Huang | H04B 15/00 455/190.1 |
| 9,203,654 B2* | 12/2015 | Terry | H04L 25/0204 |
| 9,548,878 B2* | 1/2017 | Gupta | H04L 27/2096 |
| 9,554,303 B1* | 1/2017 | Hitt | H04W 8/20 |
| 2001/0005401 A1 | 6/2001 | Ishida et al. | |
| 2009/0060073 A1 | 3/2009 | Yano et al. | |
| 2009/0080556 A1* | 3/2009 | Duan | H04L 27/2617 375/262 |
| 2010/0067615 A1* | 3/2010 | Dorpinghaus | H04L 27/2618 375/295 |
| 2010/0150256 A1* | 6/2010 | Morris | H04L 27/2624 375/260 |
| 2010/0177847 A1 | 7/2010 | Woodward | |
| 2011/0182377 A1 | 7/2011 | Fujii et al. | |
| 2013/0004180 A1* | 1/2013 | Gupta | H04L 27/2096 398/115 |
| 2013/0170840 A1* | 7/2013 | Chang | H04B 10/25754 398/115 |
| 2014/0003553 A1* | 1/2014 | Lozhkin | H03F 1/3241 375/297 |
| 2014/0056583 A1* | 2/2014 | Giddings | H04L 27/2663 398/44 |
| 2015/0381217 A1 | 12/2015 | Kim et al. | |

FOREIGN PATENT DOCUMENTS

| | | |
|---|---|---|
| JP | 2008-085379 A | 4/2008 |
| JP | 2009-55558 A | 3/2009 |
| JP | 2009-290493 A | 12/2009 |
| JP | 2013-515424 A | 5/2013 |
| JP | 2013-153479 A | 8/2013 |
| WO | WO 2011/098861 A1 | 8/2011 |

OTHER PUBLICATIONS

Han et al., Experimental Comparison of the Multi-IF Carrier Generation Methods in IF-over-Fiber System Using LTE Signals, 2014 International Topical Meeting on Microwave Photonics (MWP) and the 2014 9$^{th}$ Asia-Pacific Microwave Photonics Conference (APMP), 2014, pp. 311-314.

Tellado et al., Efficient Algorithms for Reducing PAR in Multicarrier Systems, Information Systems Laboratory, 1998, p. 191, Stanford University, California.

Huang et al., W-band DD-OFDM-RoF System Employing Pilot-aided PAPR Reduction, 2014 International Topical Meeting on Microwave Photonics (MWP) and the 2014 9$^{th}$ Asia-Pacific Microwave Photonics Conference (APMP), 2014, pp. 434-437.

Han et al., An Overview of Peak-to-Average Power Ratio Reduction Techniques for Multicarrier Transmission, Modulation, Coding and Signal Processing for Wireless Communications, Apr. 2005, pp. 56-65.

Mroué et al., Performance and Implementation Evaluation of TR PAPR Reduction Methods for DVB-T2, Hindawi Publishing Corporation, International Journal of Digital Multimedia Broadcasting, vol. 2010.

* cited by examiner

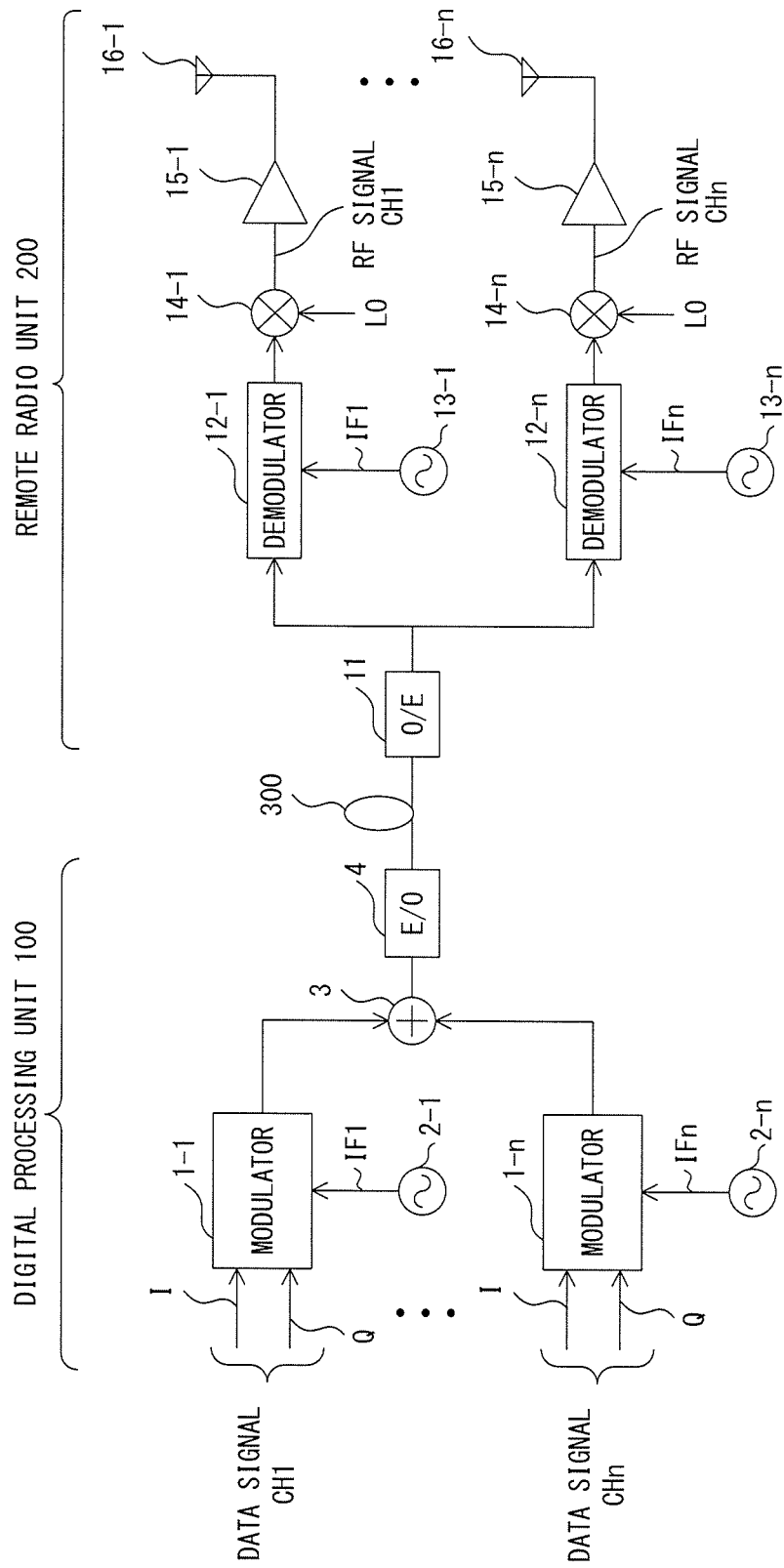
F I G. 1

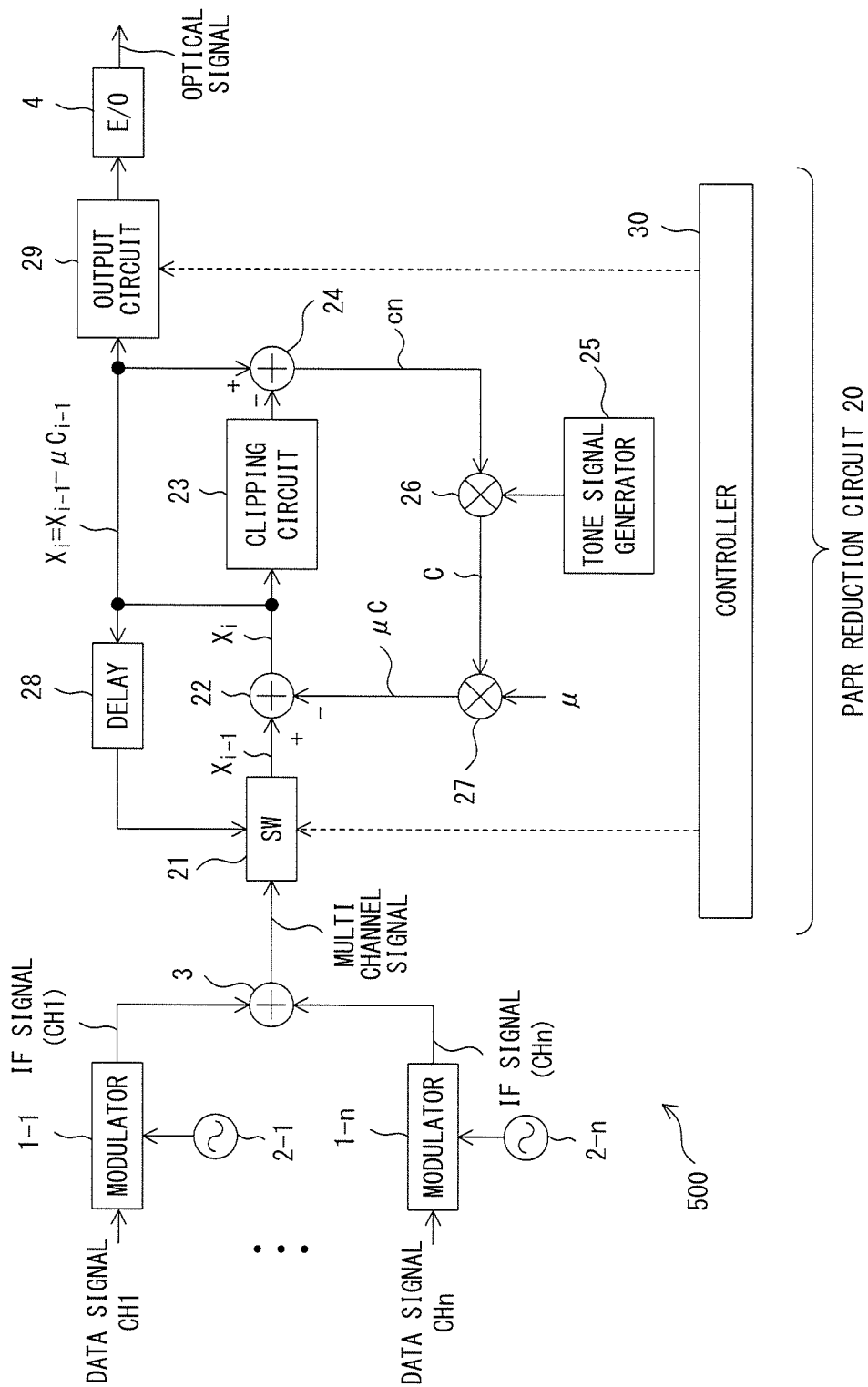
F I G. 2

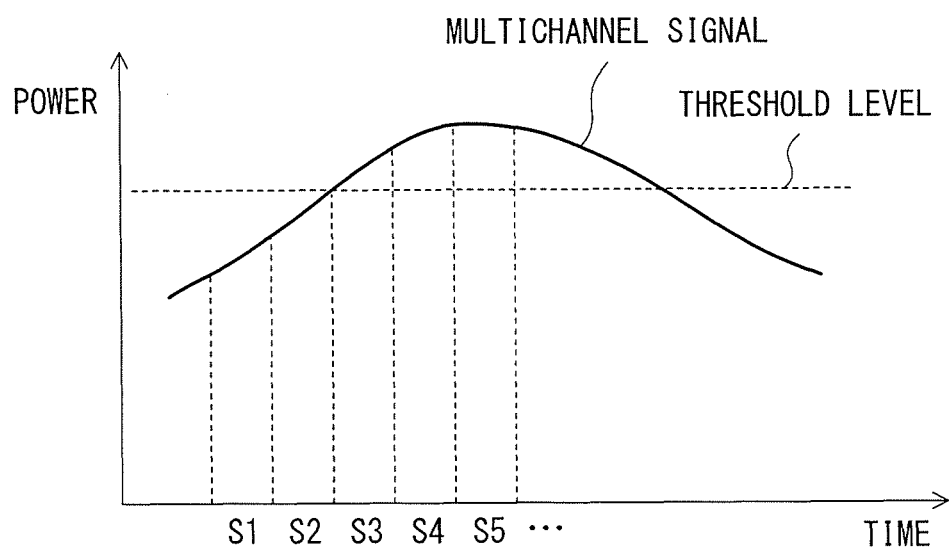
F I G. 4

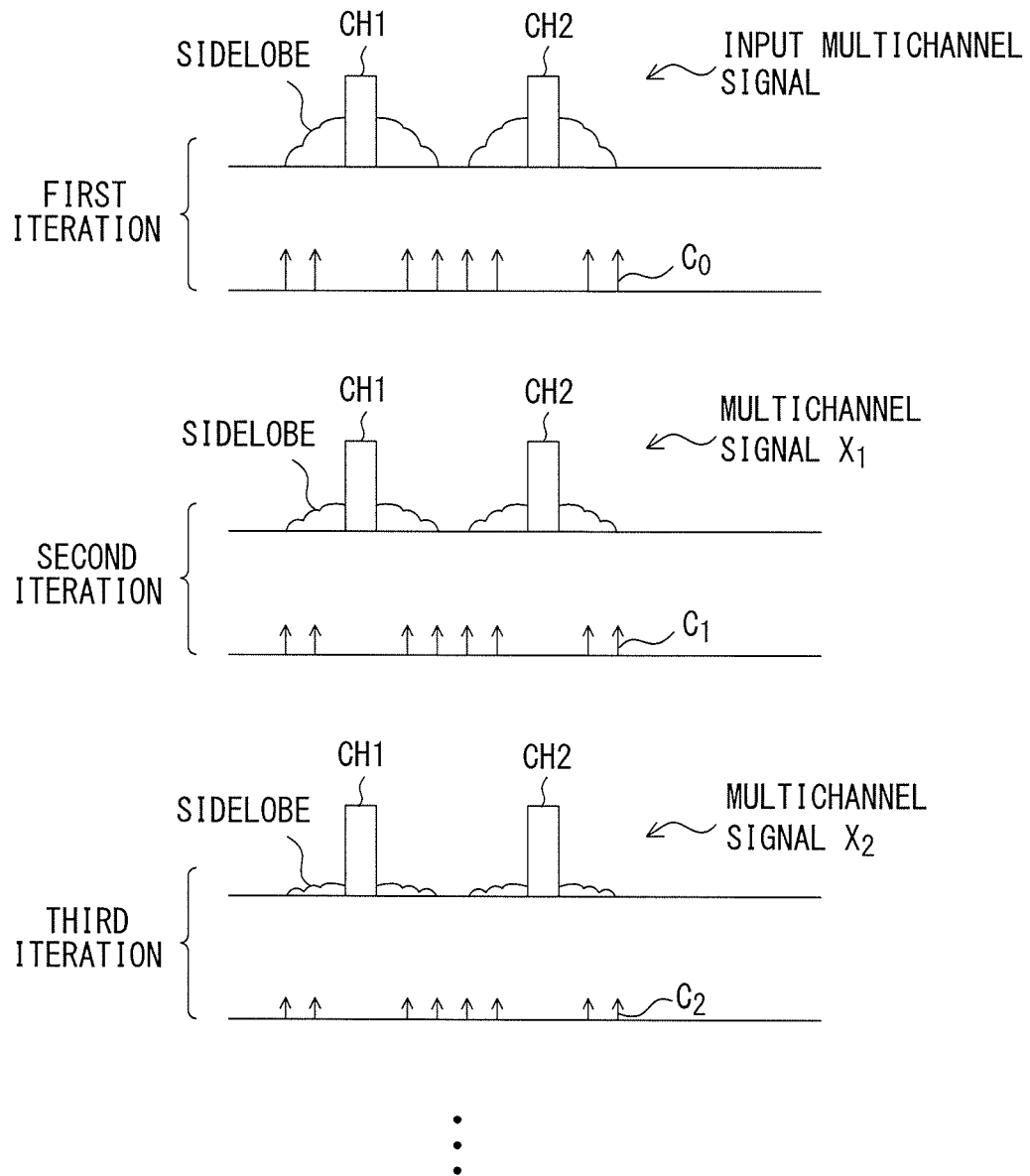
F I G. 7

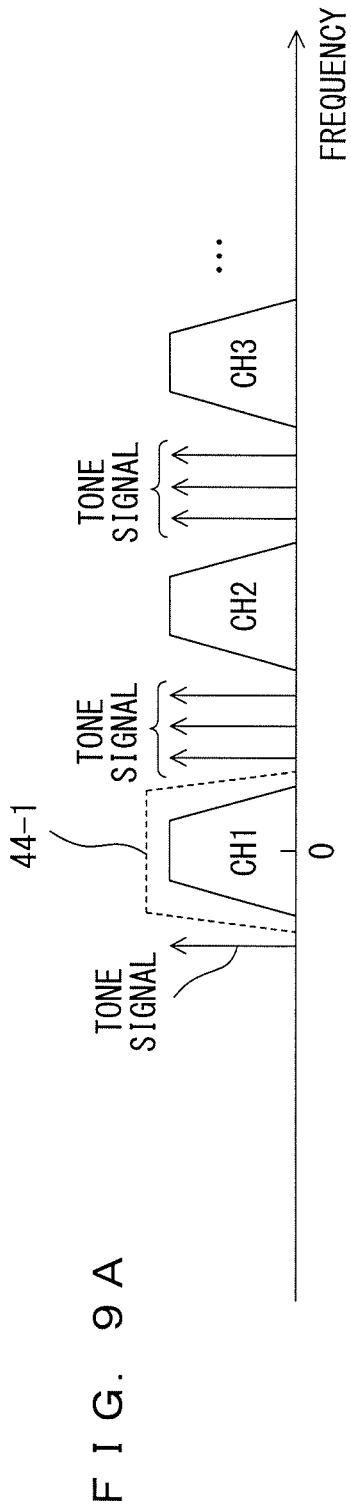
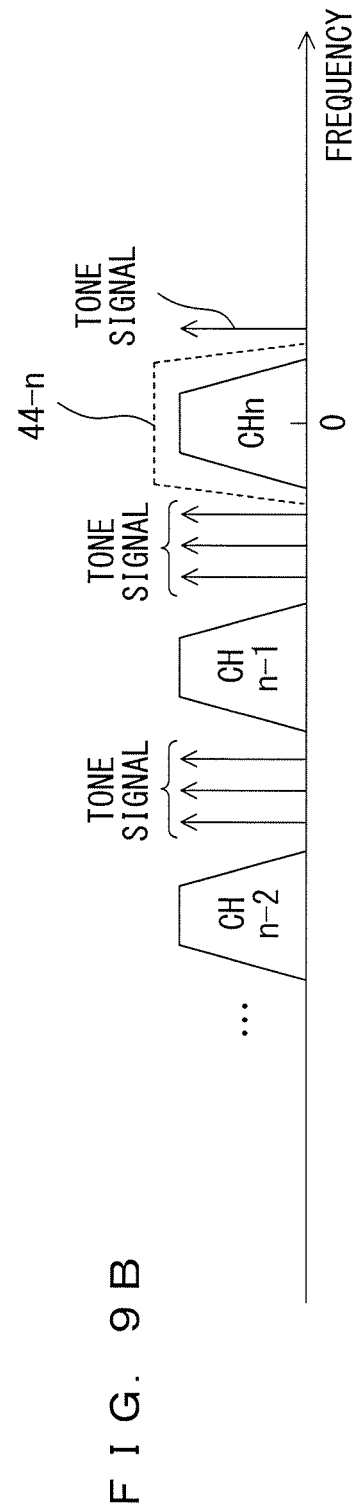
FIG. 9A
FIG. 9B

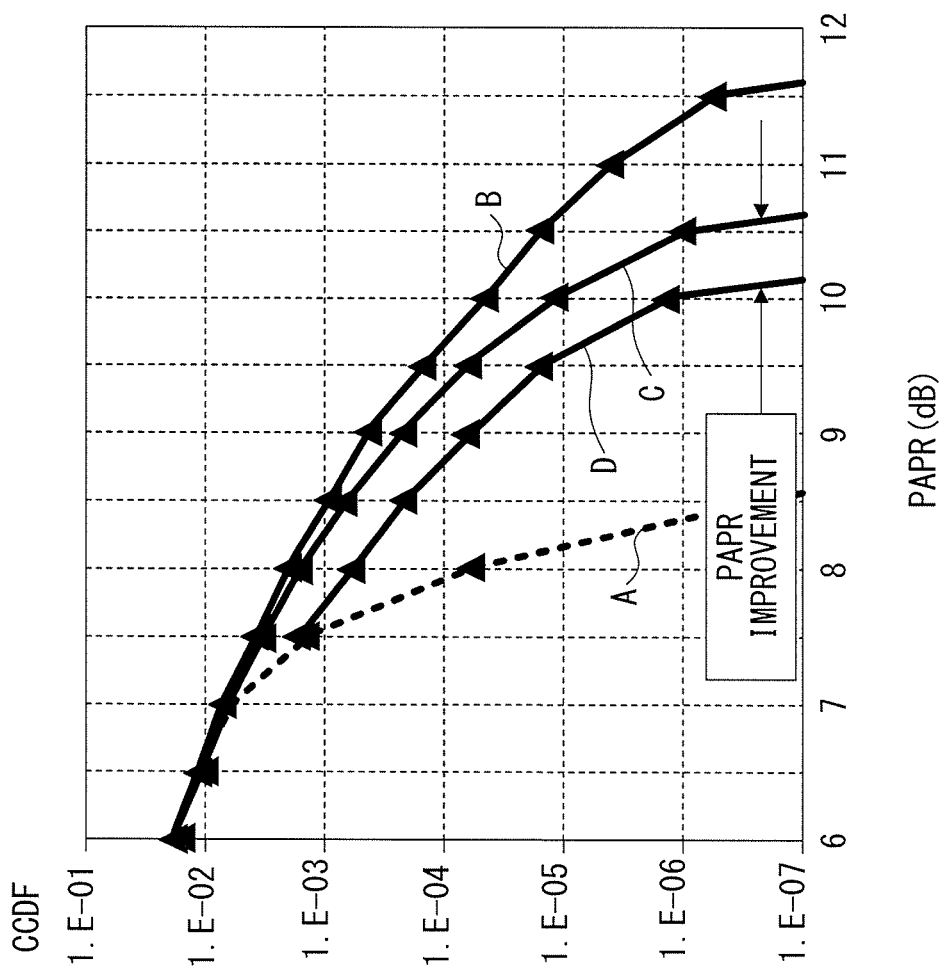
F I G. 11

F I G. 14A
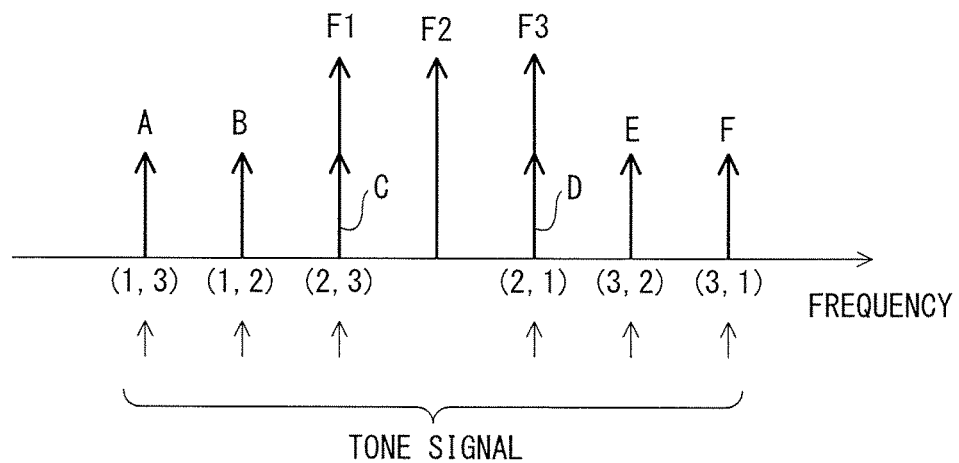
F I G. 14B
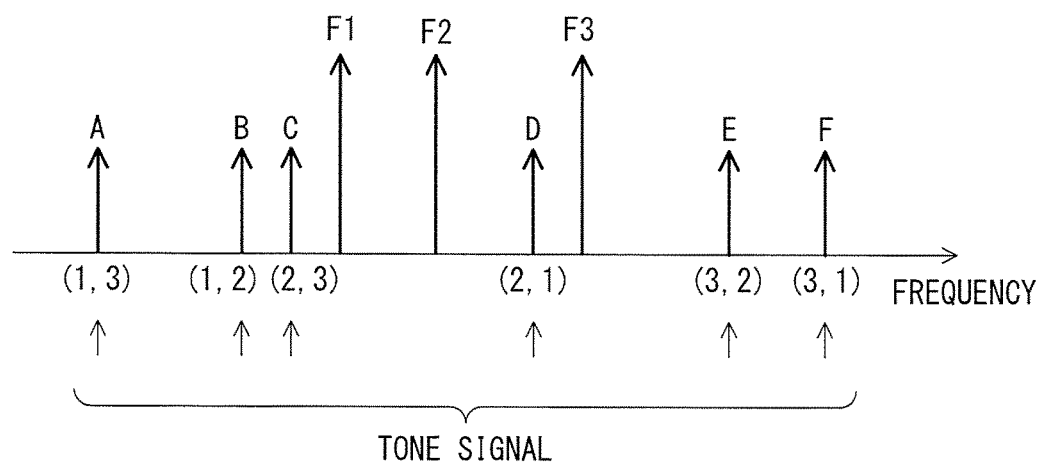

F I G. 1 7 A
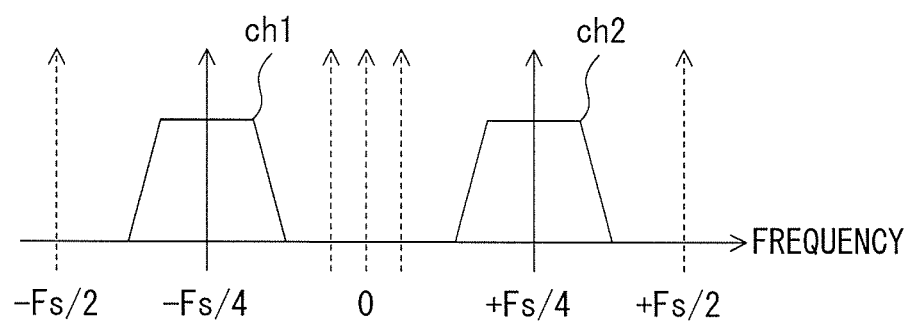
F I G. 1 7 B
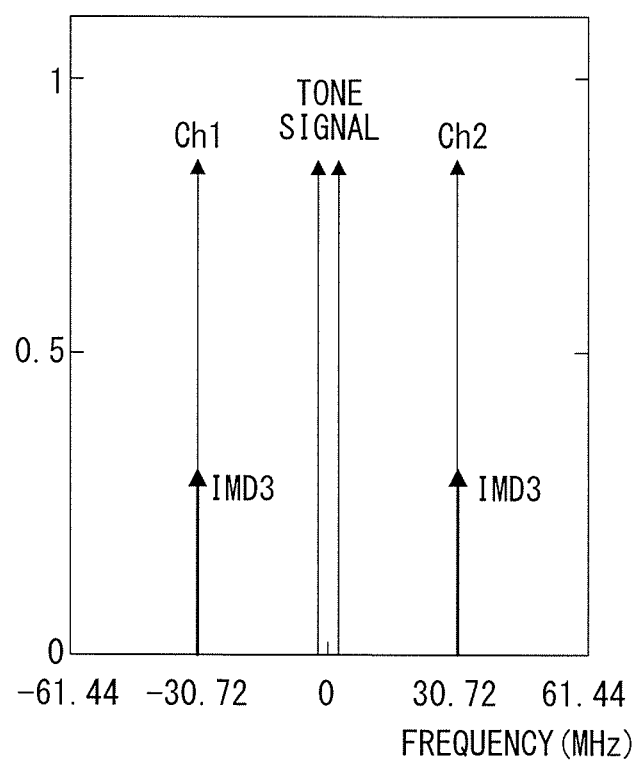

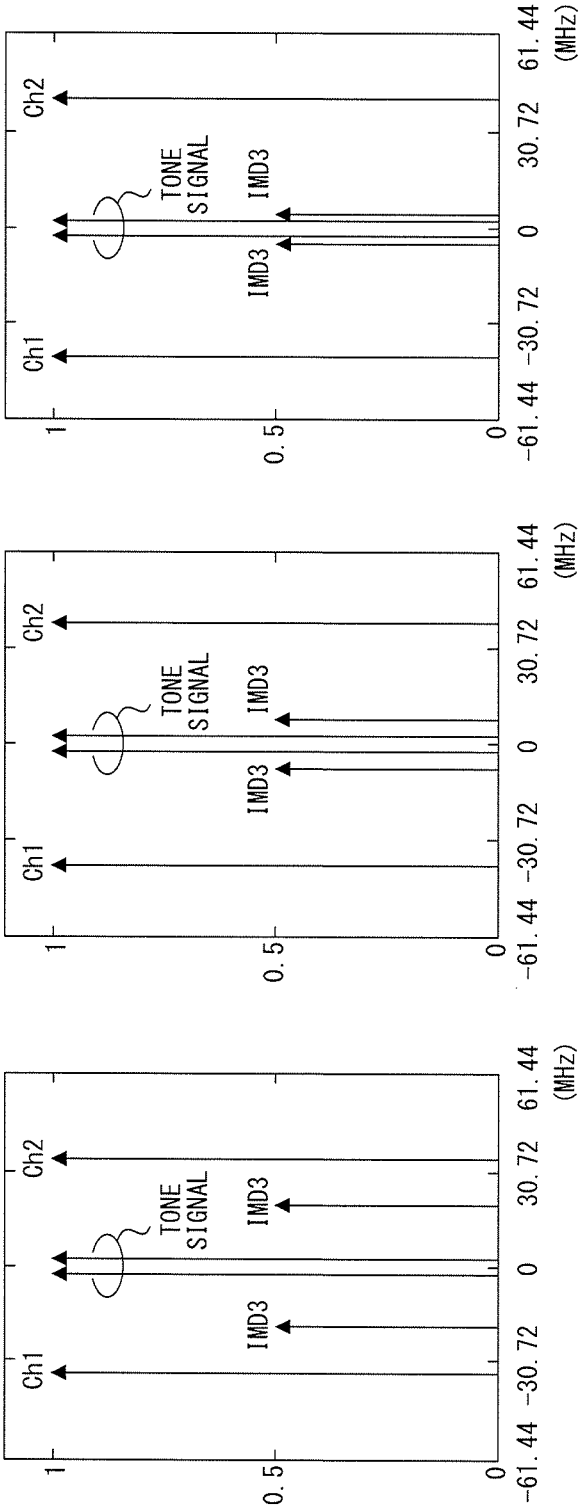

DEVICE AND METHOD FOR TRANSMITTING OPTICAL SIGNAL IN WHICH A PLURALITY OF SIGNALS ARE MULTIPLEXED

CROSS-REFERENCE TO RELATED APPLICATIONS

This application is based upon and claims the benefit of priority of the prior Japanese Patent Application No. 2015-247979, filed on Dec. 18, 2015 and the prior Japanese Patent Application No. 2016-155207, filed on Aug. 8, 2016, the entire contents of which are incorporated herein by reference.

FIELD

The embodiments discussed herein are related to a communication device that transmits an optical signal in which a plurality of signals are multiplexed and a transmission method that transmits the optical signal.

BACKGROUND

As a scheme to reduce the cost for configuring a radio communication system, a distributed antenna system (DAS) has been implemented. In the distributed antenna system, a signal processing device that processes a transmission signal and a radio device that outputs a radio signal are separated. In the following description, the signal processing device may be referred to as a "digital processing unit". The radio device may be referred to as a "remote radio unit (RRU)" or a "remote radio head (RRH)".

A transmission between a digital processing unit and a remote radio unit is implemented by, for example, radio over fiber (RoF). A radio frequency signal (RF signal) or an intermediate frequency signal (IF signal) is transmitted via an optical fiber in radio over fiber. The configuration in which an intermediate frequency signal is transmitted via an optical fiber may be referred to as IFoF (intermediate frequency over fiber). IFoF is one aspect of RoF. Note that RoF or IFoF is described in, for example, documents 1-2 below.

The digital processing unit generates an intermediate signal (hereinafter "IF signal") by, for example, up-converting a data signal. In this case, the digital processing unit converts the IF signal into an optical IF signal, and transmits the optical IF signal to the remote radio unit through an optical fiber. The remote radio unit converts the received optical IF signal into an electric signal and amplifies the electric signal. Then the remote radio unit transmits the amplified signal to a mobile station via an antenna.

In order to increase a capacity of a wireless link, a multi-antenna system that transmits a plurality of radio signals using a plurality of antennas is implemented. As an example of the multi-antenna system, a plurality of radio signals are transmitted from a plurality of transmitting antennas and received by a plurality of receiving antennas in a MIMO (Multi-Input Multi-Output) system.

In addition, a remote radio unit equipped with a plurality of transmitting antennas is proposed. In this distributed system, a plurality of signals are multiplexed and transmitted from the digital processing unit to the remote radio unit through an optical fiber. The remote radio unit respectively amplifies the signals and then outputs the amplified signals.

However, when a plurality of signals are multiplexed and transmitted, a peak-to-average power ratio (PAPR) of the multiplexed signal increases. When a peak-to-average power ratio is high, a waveform of a transmission signal may be distorted due to a saturation of a circuit element in a transmitter. For example, if a peak power of a multiplexed signal increases up to a saturation region of a laser device in a digital processing unit of the RoF system or the IFoF system, a waveform of an optical signal is distorted. In this case, communication quality may be deteriorated.

Accordingly, methods for reducing a peak-to-average power ratio have been proposed (for example, documents 3-6 below). In addition, the related technologies are described in Japanese Laid-open Patent Publication No. 2008-085379, Japanese Laid-open Patent Publication No. 2006-005390, Japanese Laid-open Patent Publication No. 2001-237800, Japanese National Publication of International Patent Application No. 2013-515424, Japanese Laid-open Patent Publication No. 2009-290493, Japanese Laid-open Patent Publication No. 2009-055558 and Japanese Laid-open Patent Publication No. 2013-153479.

The documents 1-6 are listed below.

Document 1: Charles H. Cox III et. al. "Limits on the Performance of RF-Over-FiberLinks and Their Impact on Device Design", IEEE Translations On Microwave Theory and Techniques, vol. 54, no 2, pp. 906-920, February 2006.

Document 2: Changyo Han, Seung-Hyun Cho, Hwan Seok Chung, Sang Soo Lee and Jonghyun Lee, "Experimental Comparison of the Multi-IF Carrier Generation Methods in IF-over-Fiber System Using LTE Signals", MWP 2014, Sapporo, Japan.

Document 3: Jose Tellado and John M. Cioffi, "Efficient Algorithms for Reducing PAR in Multicarrier Systems", ISIT 1998. Cambridge, Mass., USA.

Document 4: H. Han and J. H. Lee, "An overview of peak-to-average power ratio reduction techniques for multicarrier transmission", IEEE Wireless Communications, vol. 12, no. 2, pp. 56-65, April 2005.

Document 5: Mohamad Mroue, Amor Nafkha, Jacques Palicot, Benjamin Gavalda, and Nelly Dagorne, "Performance and Implementation Evaluation of TR PAPR Reduction Methods for DVB-T2", Hindawi Publishing Corporation International Journal of Digital Multimedia Broadcasting Volume 2010, Article ID 797393, 10 pages doi:10.1155/2010/797393

Document 6: Hou-Tzu Huang et al. "W-band DD-OFDM-RoF System Employing Pilot-aided PAPR Reduction" Wireless Microwave Photonics (WMP) 2014

In the prior art, for example, a peak-to-average power ratio is reduced by "clipping" a peak power of an electric signal in a transmitter that transmits an optical signal. In this case, the optical signal is generated from the clipped electric signal and transmitted to a corresponding device (for example, a remote radio unit). However, according to this method, a waveform of a signal recovered in the corresponding device is distorted. That is, although a waveform distortion due to a saturation of a laser device may be avoided, a waveform of a signal recovered in the receiver may be distorted.

SUMMARY

According to an aspect of the present invention, a communication device includes: a signal generator configured to generate a plurality of intermediate frequency signals; a combiner configured to combine the plurality of intermediate frequency signals to generate a multichannel signal; a reduction unit configured to reduce a peak-to-average power ratio of the multichannel signal; and a converter configured to convert the multichannel signal whose peak-to-average power ratio is reduced by the reduction unit into an optical signal. The reduction unit reduces a power of the multichannel signal using supplemental signals, frequencies of the supplemental signals being different from frequencies of the intermediate frequency signals, when the power of the multichannel signal is higher than a specified threshold level.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 illustrates an example of a communication system using radio over fiber.

FIG. 2 illustrates an example of a digital processing unit according to an embodiment of the present invention.

FIG. 4 illustrates an example of sampling of a multichannel signal.

FIG. 7 schematically illustrates a signal processing of the PAPR reduction circuit.

FIGS. 9A and 9B are illustrate examples of a filter for removing a tone signal.

FIG. 11 illustrates a simulation result with respect to a peak-to-average power ratio reduction.

FIGS. 14A and 14B illustrate an example of adjustment of carrier frequency and allocation of tone signal.

FIGS. 17A through 18C illustrate an example of another method for allocating IF signals and tone signals.

DESCRIPTION OF EMBODIMENTS

Figure 3:
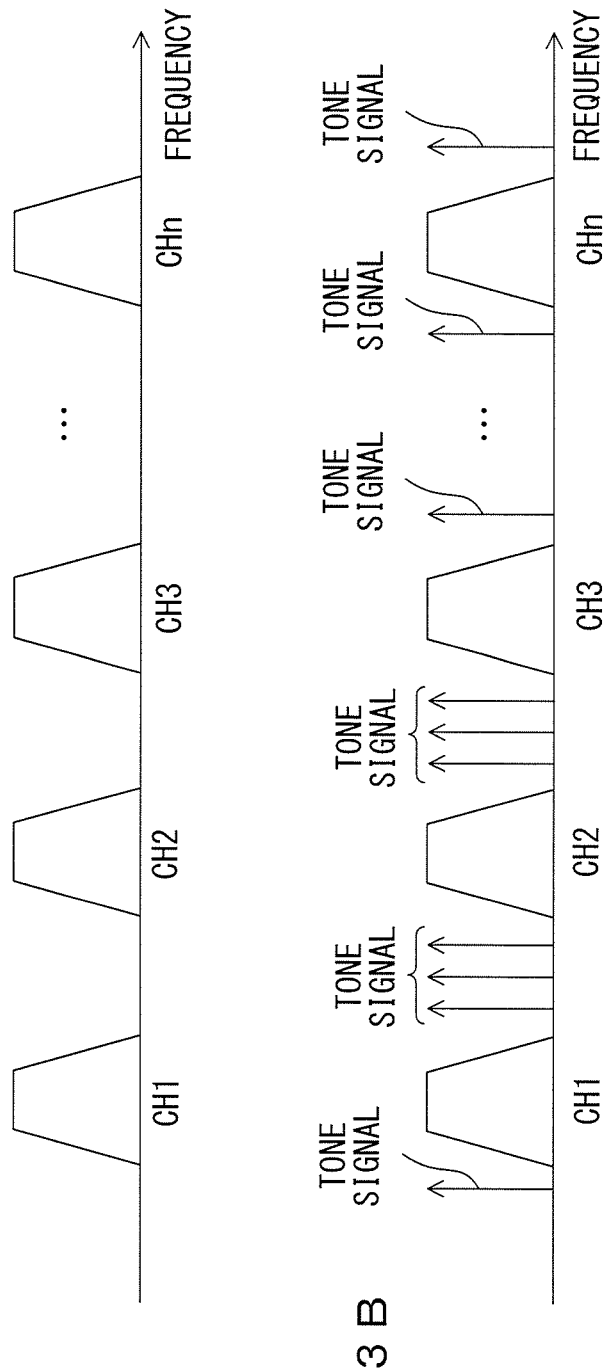
FIGS. 3A and 3B illustrate examples of a multichannel signal.

FIG. 1 illustrates an example of a communication system using radio over fiber (RoF). The communication system illustrated in FIG. 1 includes a digital processing unit 100, a remote radio unit 200, and an optical fiber cable 300 that is provided between the digital processing unit 100 and the remote radio unit 200.

The digital processing unit 100 includes a plurality of modulators 1-1 through 1-n, a plurality of oscillators 2-1 through 2-n, a combiner 3, and an E/O (Electrical-to-Optical) converter circuit 4. Data signals CH1 through CHn in a baseband are respectively input to the modulators 1-1 through 1-n. Each of the data signals CH1 through CHn is generated by, for example, OFDM (Orthogonal Frequency Division Multiplexing). OFDM transmits data by using a plurality of subcarriers that are orthogonal to each other. Note that, in the example of FIG. 1, each of the data signals CH1 through CHn is indicated by an I (In-phase) component and a Q (Quadrature) component. In addition, oscillator signals IF1 through IFn generated by the oscillators 2-1 through 2-n are respectively input to the modulators 1-1 through 1-n. The frequencies of the oscillator signals IF1 through IFn are different from each other. The oscillator signals IF1 through IFn are allocated in the intermediate frequency band in this example.

The modulators 1-1 through 1-n generate IF signals CH1 through CHn by modulating the oscillator signals IF1 through IFn with the data signals CH1 through CHn, respectively. The IF signals CH1 through CHn are modulated signals that respectively transmit the data signals CH1 through CHn. The combiner 3 combines the IF signals CH1 through CHn. The E/O converter circuit 4 converts the output signal of the combiner 3 into an optical signal. The E/O converter circuit 4 may be configured to include a laser element. The optical signal output from the E/O converter circuit 4 is transmitted through the optical fiber cable 300 to the remote radio unit 200. That is, the data signals CH1 through CHn are transmitted to the remote radio unit 200 by intermediate frequency over fiber (IFoF). Note that frequencies of carriers (that is, oscillator signals IF1 through IFn) of the data signals CH1 through CHn are different from each other. Thus, the data signals CH1 through CHn are transmitted to the remote radio unit 200 in frequency-division multiplexing. In other words, a multichannel signal in which a plurality of IF signals are multiplexed is transmitted from the digital processing unit 100 to the remote radio unit 200.

The remote radio unit 200 includes an O/E (Optical to Electrical) converter circuit 11, a plurality of demodulators 12-1 through 12-n, a plurality of oscillators 13-1 through 13-n, a plurality of mixers 14-1 through 14-n, a plurality of amplifiers 15-1 through 15-n, and a plurality of antennas 16-1 through 16-n. The remote radio unit 200 receives the optical signal output from the digital processing unit 100 through the optical fiber cable 300.

The O/E converter circuit 11 converts the received optical signal into an electric signal. The electric signal includes the IF signals CH1 through CHn. The O/E converter circuit 11 may be configured to include a photo diode. The demodulators 12-1 through 12-n demodulate the IF signals CH1 through CHn included in the output signal of the O/E converter circuit 11 using oscillator signals IF1 through IFn generated by the oscillators 13-1 through 13-n, respectively. Note that frequencies of the oscillator signals IF1 through IFn generated by the oscillators 2-1 through 2-n in the digital processing unit 100 are substantially the same as frequencies of the oscillator signals IF1 through IFn generated by the oscillators 13-1 through 13-n in the remote radio unit 200, respectively. Thus, the data signals CH1 through CHn in a baseband are respectively recovered by the demodulators 12-1 through 12-n.

The mixers 14-1 through 14-n up-convert the recovered data signals CH1 through CHn using an oscillator signal LO of a radio frequency to generate RF signals CH1 through CHn, respectively. Modulators may be provided between the demodulators 12-1 through 12-n and the mixers 14-1 through 14-n. In this case, the mixers 14-1 through 14-n up-convert modulated signals using the oscillator signal LO to generate the RF signals CH1 through CHn, respectively.

The amplifiers 15-1 through 15-$n$ respectively amplify the RF signals CH1 through CHn. In this example, each of the amplifiers 15-1 through 15-$n$ is a high-power amplifier (HPA). The antennas 16-1 through 16-$n$ output the RF signals CH1 through CHn amplified by the amplifiers 15-1 through 15-$n$, respectively.

The communication system according to the embodiments of the present invention may be applied to a MIMO system for example. Note that the digital processing unit 100 is an example of a communication device that transmits a multichannel signal in which a plurality of signals (for example, intermediate frequency signals) are multiplexed. The remote radio unit 200 is an example of a remote device that receives the multichannel signal transmitted from the digital processing unit 100.

FIG. 2 illustrates an example of a digital processing unit according to an embodiment of the present invention. The digital processing unit 500 according to the embodiment includes a plurality of modulators 1-1 through 1-$n$, a plurality of oscillators 2-1 through 2-$n$, a combiner 3, an E/O converter circuit 4, and a PAPR reduction circuit 20, as illustrated in FIG. 2. Note that the digital processing unit 500 illustrated in FIG. 2 may be used in place of the digital processing unit 100 in the communication system illustrated in FIG. 1. That is, the digital processing unit 500 can transmit an optical signal to the remote radio unit 200 via optical fiber cable 300.

The modulators 1-1 through 1-$n$, the oscillators 2-1 through 2-$n$, and the combiner 3 are substantially the same in FIG. 1 and FIG. 2. That is, the modulators 1-1 through 1-$n$ and the oscillators 2-1 through 2-$n$ generate the IF signals CH1 through CHn. Note that frequencies of the IF signals CH1 through CHn are different from each other. The combiner 3 combines the IF signals CH1 through CHn to generate a multichannel signal.

The PAPR reduction circuit 20 includes a switch 21, a subtractor 22, a clipping circuit 23, a subtractor 24, a tone signal generator 25, multipliers 26 and 27, a delay circuit 28, an output circuit 29, and a controller 30. The PAPR reduction circuit 20 reduces a peak-to-average power ratio of the multichannel signal as necessary. For example, when a power of the multichannel signal generated by the combiner 3 is higher than a specified threshold level, the PAPR reduction circuit reduces a power of the multichannel signal using a supplemental signal (a tone signal in this embodiment) of a frequency that is different from frequencies of the IF signals CH1 through CHn multiplexed in the multichannel signal.

The PAPR reduction circuit 20 performs a signal processing, for example, in a frequency domain. In this case, the digital processing unit 500 may include a Fast Fourier Transform (FFT) circuit for converting a multichannel signal of a time domain into a multichannel signal of a frequency domain between the combiner 3 and the PAPR reduction circuit 20. If the combiner 3 outputs an analog multichannel signal, the digital processing unit 500 may further include an A/D (Analog-to-Digital) converter between the combiner 3 and the FFT circuit. In addition, the digital processing unit 500 may include an inverse Fast Fourier Transform (IFFT) circuit for converting a multichannel signal of a frequency domain into a multichannel signal of a time domain and a D/A (Digital-to-Analog) converter between the PAPR reduction circuit 20 and the E/O converter circuit 4.

The multichannel signal output from the combiner 3 is guided to the switch 21 in the PAPR reduction circuit 20. As illustrated in FIG. 3A, the IF signals CH1 through CHn are multiplexed in the multichannel signal output from the combiner 3. The IF signals CH1 through CHn are allocated in an intermediate frequency range. The IF signals CH1 through CHn are allocated, for example, in 60 MHz spacing.

The multichannel signal is generated by multiplexing IF signals CH1 through CHn that have different carrier frequencies. Thus, a power of the multichannel signal changes with respect to time as illustrated in FIG. 4. The PAPR reduction circuit 20 samples the multichannel signal output from the combiner 3 in a specified time interval and processes the sampled signal. In the example illustrated in FIG. 4, the PAPR reduction circuit 20 processes the multichannel signal sampled at S1, S2, S3, . . . .

The PAPR reduction circuit 20 compares a power of the multichannel signal and the specified threshold level at every sampling period. When the power of the multichannel signal is higher than the threshold level, the PAPR reduction circuit 20 reduces the power of the multichannel signal. Note that the threshold level is determined based on, for example, characteristics of the E/O converter circuit 4. As an example, the threshold level is determined such that a power of an output optical signal does not saturate with respect to an amplitude of an input electric signal in the E/O converter circuit 4.

The PAPR reduction circuit 20 performs an iteration for reducing a peak power of the multichannel signal for every sampling. It is assumed that the number of iterations is specified in advance. According to the iteration, the peak power of the multichannel signal gradually approaches the threshold level.

The switch 21 selects an input multichannel signal or an output signal of the delay circuit 28 according to an instruction from the controller 30. Specifically, the switch 21 selects the input multichannel signal in an initial state of the iteration for each sampling. Then the switch 21 selects the output signal of the delay circuit 28 during a period in which the iteration is performed. The output signal of the switch 21 is guided to the subtractor 22. The subtractor 22 subtracts the output signal of the multiplier 27 from the output signal of the switch 21. Note that an operation result of the subtractor 22 will be used in the next operation of the iteration. Thus, in the following description, the multichannel signal output from the subtractor 22 (that is, a multichannel signal that is being processed in the PAPR reduction circuit 20) may be referred to as a "multichannel signal X". Note that the multichannel signal X includes the IF signals CH1 through CHn illustrated in FIG. 3A. In addition, the multichannel signal X may include a tone signal described below.

The clipping circuit 23 compares a power of an input signal and a specified threshold level. The multichannel signal X generated by the subtractor 22 is input to the clipping circuit 23. The threshold level is determined based on the characteristics of the E/O converter circuit 4 as described above. Note that the threshold level may be referred to as a "clipping level". When the power of the input signal is higher than the threshold level, the clipping circuit 23 removes signal components corresponding to a difference between the power of the input signal and the threshold level from the input signal. Then the subtractor 24 subtracts the output signal of the clipping circuit 23 from the multichannel signal X.

Figure 5:
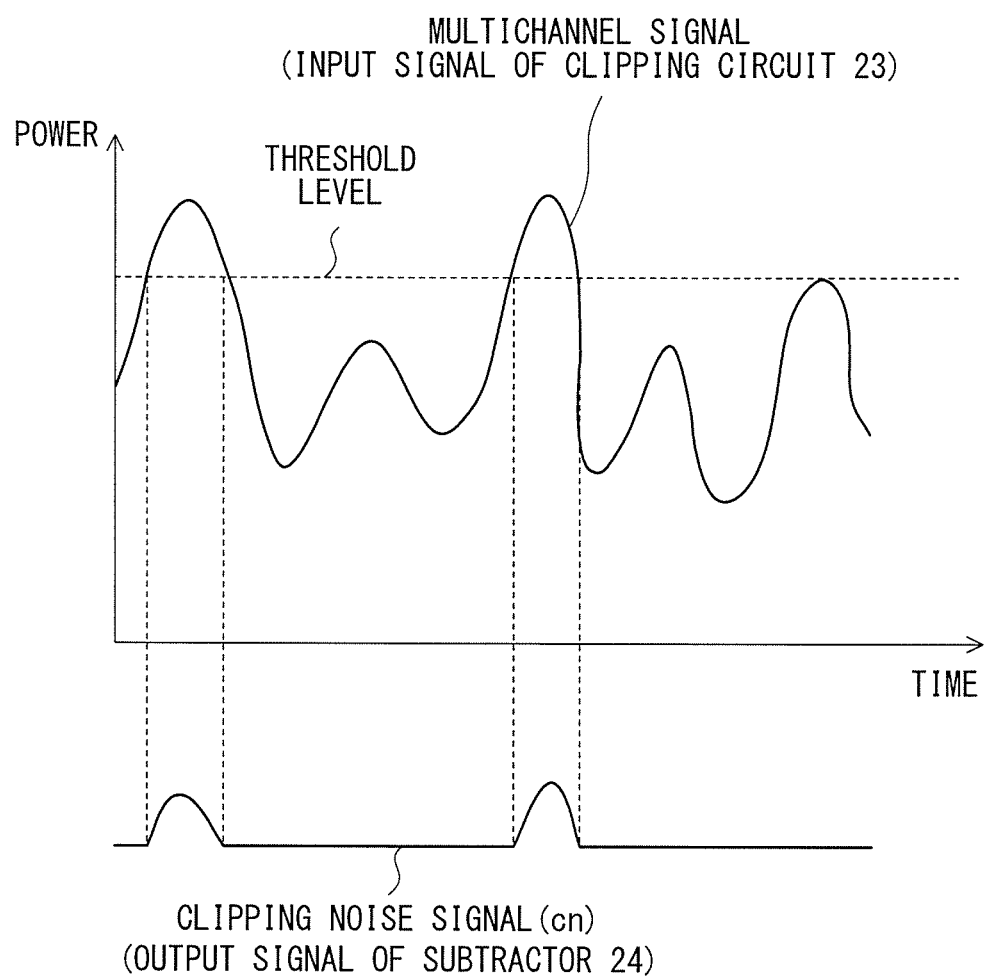
FIG. 5 illustrates an example of an operation performed by a clipping circuit and a subtractor.

FIG. 5 illustrates an example of an operation performed by the clipping circuit 23 and the subtractor 24. When the power of the multichannel signal X is lower than the threshold level, the clipping circuit 23 does not change the multichannel signal X. In this case, the output signal of the subtractor 24 is "zero". On the other hand, when the power of the multichannel signal X is higher than the threshold level, the clipping circuit 23 removes signal components corresponding to a difference between the power of the multichannel signal X and the threshold level from the multichannel signal X. Then the subtractor 24 calculates a difference between the multichannel signal X and the output signal of the clipping circuit 23. Therefore, as illustrated in FIG. 5, the output signal of the subtractor 24 indicates the signal components removed by the clipping circuit 23. In the following description, the output signal of the subtractor 24 may be referred to as a "clipping noise signal cn". Note that an intensity of the clipping noise signal cn is approximately constant across a wide frequency range.

The tone signal generator 25 generates a tone signal of a frequency that is specified in advance. In this example, the tone signal generator 25 generates a plurality of tone signals. In this case, frequencies of the tone signals are different from each other. In addition, as illustrated in FIG. 3B, the frequencies of the tone signals are different from each of the carrier frequencies of the IF signals CH1 through CHn included in the multichannel signal. Note that when each of the IF signals CH1 through CHn are respectively generated in OFDM, the tone signal is generated independently from or regardless of subcarriers of the IF signals CH1 through CHn.

For example, the tone signal is allocated between frequency channels. In the example illustrated in FIG. 3B, three tone signals are allocated between the IF signal CH1 and the IF signal CH2, and three tone signals are allocated between the IF signal CH2 and the IF signal CH3. In addition, the tone signal may be allocated outside a frequency band of the multichannel signal. In the example illustrated in FIG. 3B, a tone signal is allocated on a lower frequency side of the IF signal CH1, and a tone signal is allocated on a higher frequency side of the IF signal CHn. The tone signal is allocated so as not to overlap a spectrum of each of the IF signals. A shape and a width of the IF signal depends on a bit rate and a modulation format and so on.

In this example, amplitudes of the tone signals generated by the tone signal generator 25 are substantially the same as each other. However, amplitudes of the tone signals generated by the tone signal generator 25 are not necessarily the same as each other. Note that the tone signal is an example of a supplemental signal that is used in reducing a peak-to-average power ratio of the multichannel signal.

The multiplier 26 multiplies the output signal of the subtractor 24 by the tone signals. That is, the multiplier 26 multiplies the clipping noise signal cn by the tone signals. Thus, the multiplier 26 provides a frequency masking using the tone signals on the clipping noise signal cn. Namely, the multiplier 26 outputs the clipping noise signal cn at frequencies of the tone signals, and outputs "zero" at other frequencies. In other words, a signal C output from the multiplier 26 includes only frequencies of the tone signals. Note that when a power of the multichannel signal X is lower than the threshold level, the clipping noise signal cn is "zero", and the signal C output from the multiplier 26 is also "zero".

The multiplier 27 multiplies the signal C output from the multiplier 26 by a parameter μ. The parameter μ is a real number that is larger than zero and smaller than 1. That is, the multiplier 27 reduces an amplitude of the signal C. Then, as described above, the subtractor 22 subtracts the output signal of the multiplier 27 from the output signal of the switch 21 to generate the multichannel signal X.

The multichannel signal X generated by the subtractor 22 is guided to the clipping circuit 23, the delay circuit 28, and the output circuit 29. The clipping circuit 23 clips the multichannel signal X as described above. The delay circuit 28 delays the multichannel signal X. For example, the delay circuit 28 temporally stores the multichannel signal X. The multichannel signal X stored in the delay circuit 28 is read out for a next operation of the iteration and guided to the switch 21. That is, the multichannel signal X obtained in a previous operation of the iteration is guided to the subtractor 22 via the switch 21. The output circuit 29 stores a latest multichannel signal X in the iteration. Then, upon receiving an output instruction that indicates a completion of the iteration from the controller 30, the output circuit 29 reads out the latest multichannel signal X and outputs it.

The operations of the PAPR reduction circuit 20 will be explained below. In the following descriptions, it is assumed that a multichannel signal illustrated in FIG. 4 is output from the combiner 3. The IF signals CH1-CHn are multiplexed in the multichannel signal as illustrated in FIG. 3A. The PAPR reduction circuit 20 samples the multichannel signal at a specified time interval and processes the multichannel signal.

The PAPR reduction circuit 20 performs an iteration for reducing a peak-to-average power ratio on the sampled multichannel signal. In the following descriptions, "i" represents the number of iterations executed by the PAPR reduction circuit 20. For example, $X_i$ represents an operation result by the subtractor 22 in the i-th iteration.

The multichannel signal sampled in the sampling period S1 is guided to the switch 21. In the initial state of the iteration, the switch 21 selects an output signal of the combiner 3 (that is, the input multichannel signal). Note that the multichannel signal input to the PAPR reduction circuit 20 may be referred to as an "original multichannel signal". Then the subtractor 22 subtracts the output signal of the multiplier 27 from the input multichannel signal to generate a multichannel signal $X_0$. In this example, the signal C in the initial state of the iteration is "zero". Thus, the original multichannel signal (that is, the multichannel signal input to the PAPR reduction circuit 20) is input to the clipping circuit 23 as the multichannel signal $X_0$. At this time, the multichannel signal $X_0$ is stored in the delay circuit 28.

The clipping circuit 23 compares a power of the input signal of the clipping circuit 23 and the threshold level. Here, the power of the multichannel signal sampled in the sampling period S1 is lower than the threshold level. In this case, the clipping noise signal $cn_0$ output from the subtractor 24 is zero, and the signal $\mu C_0$ generated by the multipliers 26 and 27 is also zero.

Then the iteration for the sampling period S1 is performed. While the iteration is performed, the switch 21 selects the signal stored in the delay circuit 28. Here, in the delay circuit 28, the multichannel signal $X_0$ is stored. Thus, the switch 21 selects the multichannel signal $X_0$ stored in the delay circuit 28 and guides the signal to the subtractor 22. Then the subtractor 22 subtracts the output signal of the multiplier 27 from the output signal of the delay circuit 28. That is, the subtractor 22 subtracts the signal $\mu C_0$ from the multichannel signal $X_0$. As a result, a new multichannel signal $X_1$ is generated.

As described above, the PAPR reduction circuit 20 performs a calculation $X_i = X_{i-1} + \mu C_{i-1}$ in the iteration. However, the power of the multichannel signal sampled in the sampling period S1 is lower than the threshold level. In this case, the clipping noise signal cn is always zero, and the signal μC is also always zero. Thus, in the iteration for the sampling period S1, the multichannel signal $X_i$ output from the subtractor 22 is substantially the same as the original multichannel signal illustrated in FIG. 3A.

When the number of iterations reaches N, the controller 30 gives an output instruction that indicates a completion of the iteration to the output circuit 29. It is assumed that N is specified in advance. N may be an integer in a range of 10 through 20. Upon receiving the output instruction, the output circuit 29 reads out the latest multichannel signal X (multichannel signal $X_N$ in this example) and outputs the signal. In other words, in the sampling period S1, the PAPR reduction circuit 20 does not change the input multichannel signal. As described, when the power of the input multichannel signal is lower than the threshold level, a tone signal is not added to the multichannel signal.

After the sampling period S1 is finished, the multichannel signal sampled in the sampling period S2 is guided to the switch 21. In this example, as illustrated in FIG. 4, the power of the multichannel signal sampled in the sampling period S2 is also lower than the threshold level. Thus, the PAPR reduction circuit 20 does not add a tone signal to the multichannel signal and guides the multichannel signal to the E/O converter circuit 4.

The power of the multichannel signal sampled in the sampling period S3 is higher than the threshold level, as illustrated in FIG. 4. In this case, while the PAPR reduction circuit 20 performs the iteration described above, a power of the multichannel signal is reduced. During this iteration, the tone signals may be added to the multichannel signal.

The multichannel signal sampled in the sampling period S3 is guided to the switch 21. In the initial state of the iteration, the switch 21 selects an output signal of the combiner 3 (that is, the input multichannel signal). Then the subtractor 22 subtracts the output signal of the multiplier 27 from the input multichannel signal to generate a multichannel signal $X_0$. Thus, the original multichannel signal is input to the clipping circuit 23 as the multichannel signal $X_0$. At this time, the multichannel signal $X_0$ is stored in the delay circuit 28.

The clipping circuit 23 compares a power of the input signal of the clipping circuit 23 and the threshold level. Here, the power of the multichannel signal sampled in the sampling period S3 is higher than the threshold level. In this case, the clipping noise signal $cn_0$ that indicates a difference between the power of the multichannel signal and the threshold level is generated by the clipping circuit 23 and the subtractor 24, and the signal $\mu C_0$ is generated by the multipliers 26 and 27. The signal $\mu C_0$ includes only frequency components of the tone signals. In addition, an amplitude of the signal $\mu C_0$ depends on an intensity of the clipping noise signal $cn_0$. Therefore, the signal $\mu C_0$ substantially indicates tone signals whose amplitude is dependent on the intensity of the clipping noise signal $cn_0$. The signal $\mu C_0$ is given to the subtractor 22.

Then the iteration for the sampling period S3 is performed. That is, the PAPR reduction circuit 20 performs the calculation $X_i = X_{i-1} + \mu C_{i-1}$ in the iteration. For example, in the first iteration, a new multichannel signal $X_1$ is generated by subtracting the signal $\mu C_0$ from the multichannel signal $X_0$. Here, the signal $\mu C_0$ substantially indicates tone signals whose amplitude is dependent on the intensity of the clipping noise signal $cn_0$. Thus, when the multichannel signal $X_1$ is generated by the subtractor 22 from the multichannel signal $X_0$, frequency components of the tone signals may be added to the multichannel signal. As a result, the multichannel signal $X_1$ that includes the IF signals CH1-CHn and the tone signals is generated. This multichannel signal $X_1$ is guided to the clipping circuit 23 and stored in the delay circuit 28. Note that it is considered that a portion of side lobes of the respective IF signals CH1-CHn are removed when subtracting the signal $\mu C$ from the multichannel signal X in the subtractor 22.

In the second iteration, a new multichannel signal $X_2$ is generated by subtracting the signal $\mu C_1$ from the multichannel signal $X_1$. Here, the signal $\mu C_1$ substantially indicates tone signals whose amplitude is dependent on the intensity of the clipping noise signal $cn_1$. Thus, also when the multichannel signal $X_2$ is generated from the multichannel signal $X_1$, frequency components of the tone signals may be added to the multichannel signal $X_1$.

Note that the multichannel signal $X_1$ is obtained by subtracting the signal $\mu C_0$ from the multichannel signal $X_0$. Thus, the power of the multichannel signal $X_1$ is lower than the power of the multichannel signal $X_0$. That is, a difference between the power of the multichannel signal $X_1$ and the threshold level is smaller than a difference between the power of the multichannel signal $X_0$ and the threshold level. Therefore, the intensity of the clipping noise signal $cn_1$ is lower than the intensity of the clipping noise signal $cn_0$. Accordingly, the amplitude of the tone signals in the signal $\mu C_0$ is smaller than the amplitude of the tone signals in the signal $\mu C_0$.

Then the PAPR reduction circuit 20 performs the calculation $X_i = X_{i-1} + \mu C_{i-1}$ until i=N. During this iteration, the tone signals may be added to the multichannel signal X. In addition, according to the iteration, a power of the multichannel signal X is gradually reduced to the threshold level. Note that the speed at which the multichannel signal X is gradually reduced to the threshold level is specified by the parameter $\mu$.

When the iteration is performed N times, the PAPR reduction circuit 20 outputs the latest multichannel signal X (that is, the multichannel signal $X_N$). Namely, the PAPR reduction circuit 20 may output the multichannel signal illustrated in FIG. 3B. In this case, an amplitude of the tone signals added to the multichannel signal depends on a difference between the power of the multichannel signal input to the PAPR reduction circuit 20 and the threshold level.

As described above, the PAPR reduction circuit 20 reduces a peak power of the multichannel signal using the tone signals when the power of the multichannel signal is higher than the threshold level. During this processing, frequency components of the tone signals may be added to the multichannel signal. Here, the tone signals are allocated at respective frequencies that do not overlap the IF signals CH1-CHn multiplexed in the multichannel signal. Accordingly, the IF signals CH1-CHn are not affected by the tone signals, and thus the quality of each of the IF signals CH1-CHn is not deteriorated by the tone signals.

Note that the PAPR reduction circuit 20 may be implemented by a digital signal processor that includes a processor element and a memory. In this case, the PAPR reduction circuit 20 provides the functions described above by executing a given program. However, a portion of the functions of the PAPR reduction circuit 20 may be implemented by a hardware circuit.

Figure 6:
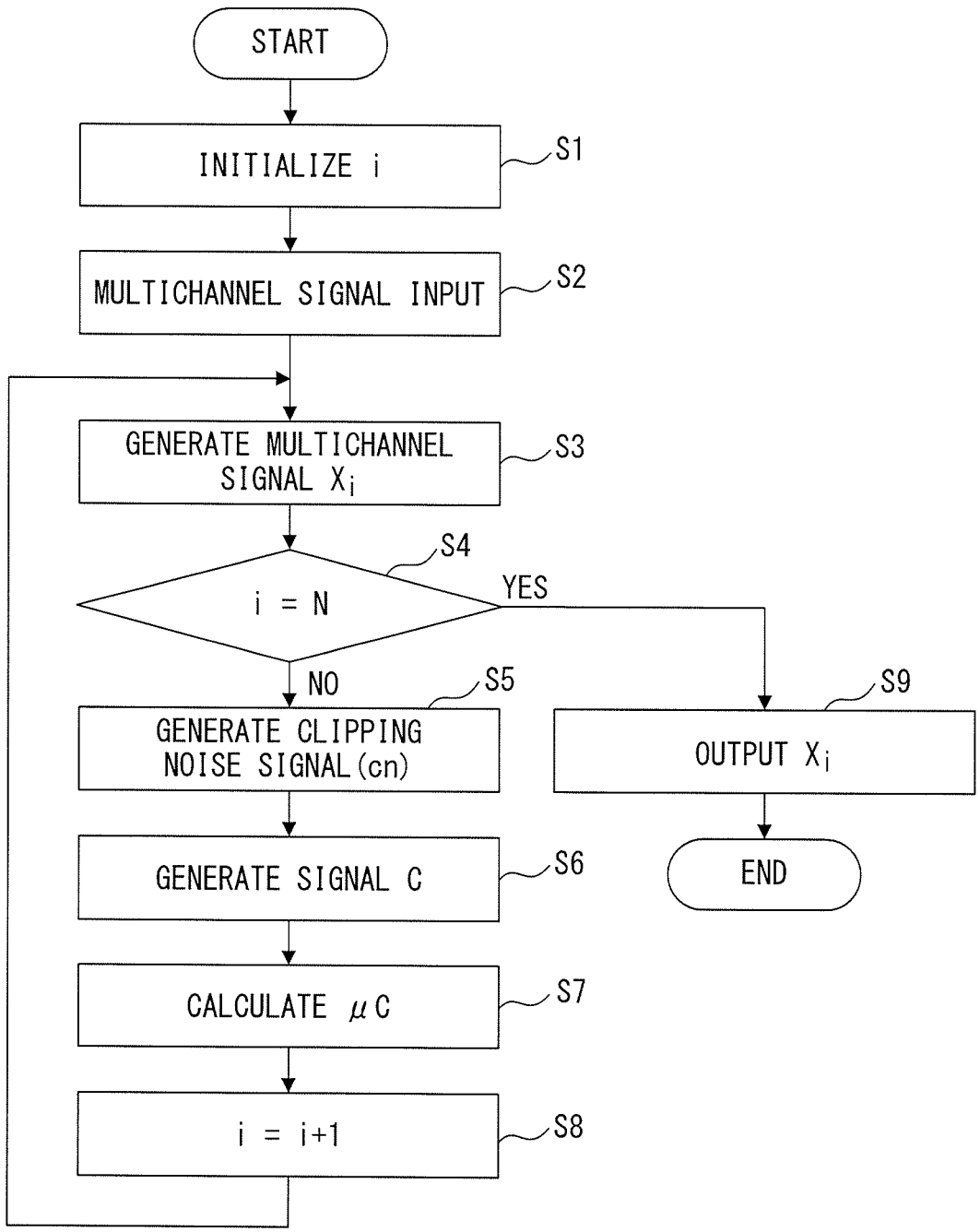
FIG. 6 is a flowchart illustrating an example of processes of a PAPR reduction circuit.

FIG. 6 is a flowchart illustrating an example of processes of the PAPR reduction circuit 20. The processes of the flowchart may be executed every time the multichannel signal output from the combiner 3 is sampled.

In S1, the controller 30 initialize a variable i that indicates the number of iterations. In S2, the controller 30 controls the switch 21 to select the multichannel signal generated by the combiner 3. By doing this, the multichannel signal generated by the combiner 3 is selected by the switch 21 and guided to the subtractor 22. Note that the clipping noise signal cn, the signal C, and the signal μC are respectively zero in the initial state of the iteration.

In S3, the subtractor 22 calculates the multichannel signal $X_i$. The multichannel signal $X_i$ is calculated by the formula below.

$$X_i = X_{i-1} + \mu C_{i-1}$$

When the power of the input multichannel signal is higher than the threshold level, the tone signals may be added to the multichannel signal and a peak power of the multichannel signal may be reduced according to this calculation.

In S4, the controller 30 decides whether the variable i reaches N. N is an integer specified in advance. In S5, the clipping circuit 23 and the subtractor 24 compares the power of the multichannel signal $X_i$ and threshold level to generate the clipping noise signal $cn_i$. Note that when the power of the input multichannel signal (that is, the multichannel signal $X_i$ when i=0) is lower than the threshold level, the clipping noise signal $cn_i$ is zero.

In S6, the multiplier 26 multiplies the clipping noise signal $cn_i$ by the tone signals to generate the signal $C_i$. The signal $C_i$ includes only frequency components of the tone signals. In S7, the multiplier 27 multiplies the signal $C_i$ by the parameter μ to generate the signal $\mu C_i$. In S8, the controller 30 increments the variable i. Then the process of the PAPR reduction circuit 20 is returned to S3.

The PAPR reduction circuit 20 repeatedly executes the processes S3-S8 until the variable i becomes N. When the variable i becomes N, the output circuit 29 outputs the latest multichannel signal X according to the output instruction given from the controller 30.

As described above, when the power of the input multichannel signal is higher than the threshold level, the processes of S3-S8 are executed N times, and accordingly, the tone signals may be added to the multichannel signal and a peak power of the multichannel signal may be gradually reduced. On the other hand, when the power of the input multichannel signal is lower than the threshold level, the clipping noise signal cn is zero. Thus, in this case, the output signal of the PAPR reduction circuit 20 is substantially the same as the input signal of the PAPR reduction circuit 20.

FIG. 7 schematically illustrates a signal processing of the PAPR reduction circuit 20. In this example, the multichannel signal includes IF signals CH1 and CH2. A power of the multichannel signal is higher than a threshold level set in the clipping circuit 23. Note that, in the description below, the parameter μ is assumed to be "1" for simplifying the explanations.

In this case, in the first iteration, the PAPR reduction circuit 20 generates a clipping noise signal $cn_0$ that indicates a difference between a power of the input multichannel signal and the threshold level. In addition, the signal $C_0$ is generated by the multiplier 26. The signal $C_0$ includes only frequency components of the tone signals. Here, the tone signals are allocated at frequencies other than the IF signals CH1 and CH2. However, it is allowed for the tone signals to overlap side lobes of the IF signals CH1 and CH2. In addition, the amplitude of the signal $C_0$ is proportional to an intensity of the clipping noise signal $cn_0$. Then a multichannel signal $X_1$ is generated by subtracting the signal $C_0$ from the input multichannel signal (that is the multichannel signal $X_0$) in the subtractor 22.

The intensity of side lobes of the multichannel signal $X_1$ is reduced in comparison with the input multichannel signal. Thus, the power of the multichannel signal $X_1$ is lower than the power of the input multichannel signal.

In the second iteration, a clipping noise signal $cn_1$ that indicates a difference between a power of the multichannel signal $X_1$ and the threshold level is generated, and the signal $C_1$ is generated by the multiplier 26. Similarly to the signal $C_0$, the signal $C_1$ includes only frequency components of the tone signals. However, since the power of the multichannel signal $X_1$ is lower than the power of the input multichannel signal, the intensity of the clipping noise signal $cn_1$ is lower than the intensity of the clipping noise signal $cn_0$. Thus, the amplitude of the signal $C_1$ is smaller than the amplitude of the signal $C_0$. And a multichannel signal $X_2$ is generated by subtracting the signal $C_1$ from the multichannel signal $X_1$ in the subtractor 22. Note that, the intensity of side lobes of the multichannel signal $X_2$ is further reduced in comparison with the multichannel signal $X_1$.

Then the processes described above are repeatedly executed a specified number of times. This iteration gradually reduces the side lobes of the IF signals CH1 and CH2, and the power of the multichannel signal is gradually reduced. That is, a peak-to-average power ratio of the multichannel signal is reduced. During this iteration, since the tone signals are allocated at frequencies other than the IF signals CH1 and CH2, the tone signals do not deteriorate a quality of the IF signals CH1 and CH2.

Figure 8:
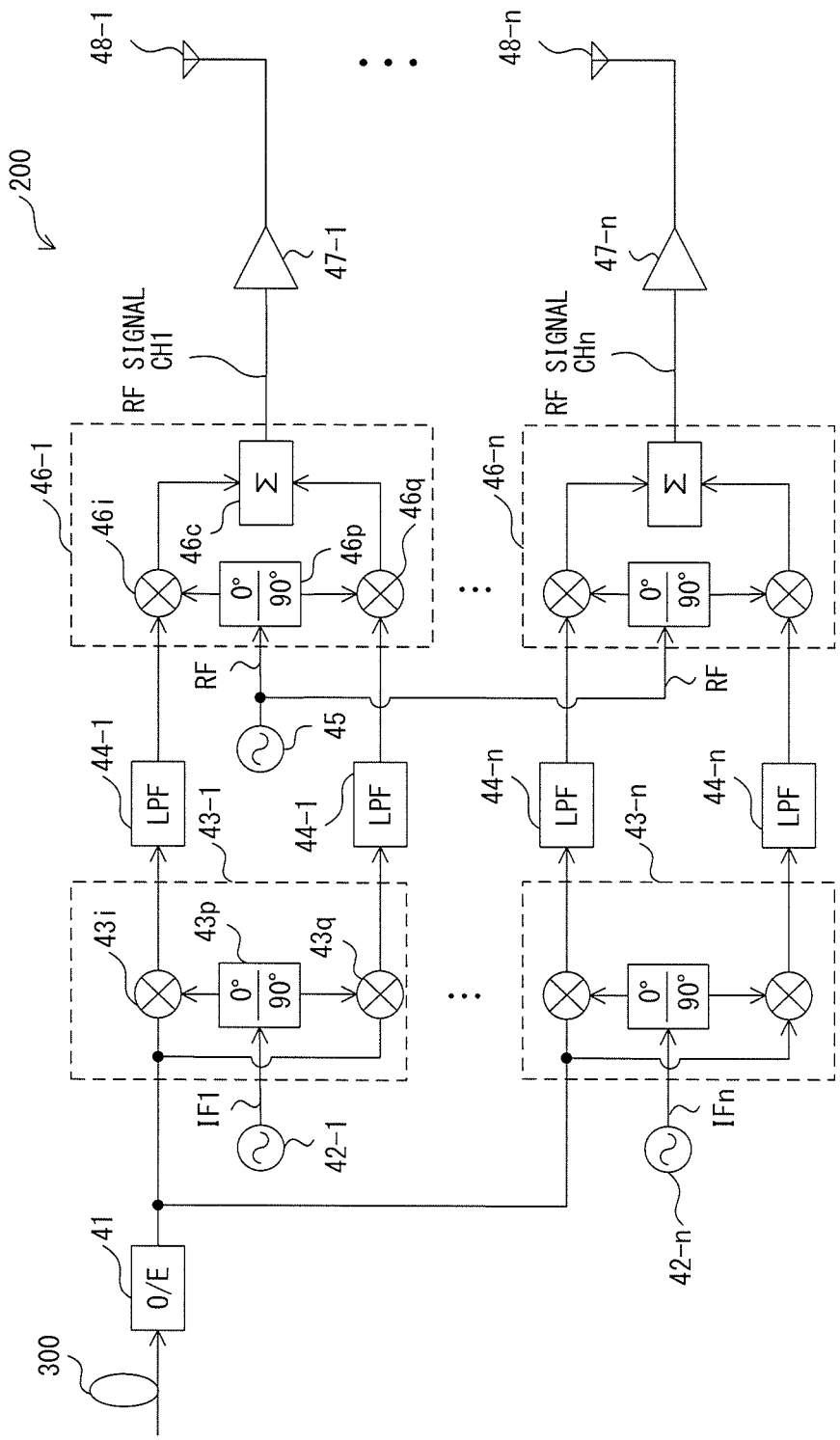
FIG. 8 illustrates an example of a remote radio unit.

FIG. 8 illustrates an example of a remote radio unit that receives an optical signal transmitted from the digital processing unit. In this example, the remote radio unit 200 receives an optical signal transmitted from the digital processing unit 500 illustrated in FIG. 2 via the optical fiber cable 300.

The remote radio unit 200 includes, as illustrated in FIG. 8, an O/E (Optical-to-Electrical) converter circuit 41, oscillators 42-1 through 42-n, demodulators 43-1 through 43-n, low-pass filters (LPF) 44-1 through 44-n, an oscillator 45, modulators 46-1 through 46-n, amplifiers 47-1 through 47-n, and antennas 48-1 through 48-n. The O/E converter circuit 41, the oscillators 42-1 through 42-n, the demodulators 43-1 through 43-n, the modulators 46-1 through 46-n, the amplifiers 47-1 through 47-n, and the antennas 48-1 through 48-n illustrated in FIG. 8 respectively correspond to the O/E converter circuit 11, the oscillators 13-1 through 13-n, the demodulators 12-1 through 12-n, the mixers 14-1 through 14-n, the amplifiers 15-1 through 15-n, and the antennas 16-1 through 16-n illustrated in FIG. 1. Note that the remote radio unit 200 may further include other circuit elements that are not illustrated in FIG. 8.

The O/E converter circuit 41 converts the optical signal received from the digital processing unit 500 through the optical fiber cable 300 into an electric signal. This electric signal represents the multichannel signal illustrated in FIG. 3A. That is, the electric signal includes the IF signals CH1-CHn. When the tone signals illustrated in FIG. 3B are added to the multichannel signal in the digital processing unit 500, the output signal of the O/E converter circuit 41 includes the IF signals CH1-CHn and the tone signals. Note that the O/E converter circuit 41 may be configured to include a photo diode.

The oscillators 42-1 through 42-n respectively generate oscillator signals IF1 through IFn. The frequencies of the oscillator signals IF1 through IFn generated by the oscillators 42-1 through 42-n are substantially the same as the oscillator signals generated by the oscillators 2-1 through 2-n in the digital processing unit 500, respectively. That is, the frequencies of the oscillator signals IF1 through IFn generated by the oscillators 42-1 through 42-n are substantially the same as the carrier frequencies of the IF signals CH1 through CHn, respectively.

The demodulators 43-1 through 43-*n* demodulate the IF signals CH1 through CHn using the oscillator signals IF1 through IFn generated by the oscillators 42-1 through 42-*n*, respectively. The configurations of the demodulators 43-1 through 43-*n* are substantially the same as each other. In this example, each of the demodulators 43-1 through 43-*n* includes a phase circuit 43*p*, and mixers 43*i* and 43*q*.

For example, in the demodulators 43-1, the phase circuit 43*p* generates a pair of oscillator signals from the oscillator signal IF1 generated by the oscillator 42-1. Phases of the pair of oscillator signals are different from each other by 90 degrees. The mixer 43*i* mixes the output signal of the O/E circuit 41 with one of the pair of the oscillator signals to recover an I component signal. Similarly, the mixer 43*q* mixes the output signal of the O/E circuit 41 with the other of the pair of the oscillator signals to recover a Q component signal. Here, a frequency of the oscillator signal IF1 generated by the oscillator 42-1 is substantially the same as a carrier frequency of the IF signal CH1 multiplexed in the multichannel signal. Thus, as illustrated in FIG. 9A, the data signal CH1 is allocated at baseband in the output signal of the demodulator 43-1.

The operations of the demodulators 43-1 through 43-*n* are substantially the same as each other. Thus, in the output signals of the demodulators 43-1 through 43-*n*, corresponding data signals are respectively allocated at baseband. For example, as illustrated in FIG. 9B, the data signal CHn is allocated at baseband in the output signal of the demodulator 43-*n*.

The low-pass filters 44-1 through 44-*n* respectively remove high frequency components from output signals of the demodulators 43-1 through 43-*n*. A cut-off frequency of each of the low-pass filters 44-1 through 44-*n* is designed to remove adjacent channels and the tone signals. Therefore, for example, the low-pass filter 44-1 removes the data signals CH2 through CHn and the tone signals from the output signal of the demodulator 43-1, and transmits the data signal CH1, as illustrated in FIG. 9A. Similarly, the low-pass filter 44-*n* removes the data signals CH1 through CHn–1 and the tone signals from the output signal of the demodulator 43-*n*, and transmits the data signal CHn, as illustrated in FIG. 9B.

The oscillator 45 generates an oscillator signal RF of a specified radio frequency. The oscillator signal RF generated by the oscillator 45 is fed to the modulators 46-1 through 46-*n*.

The modulators 46-1 through 46-*n* modulate the oscillator signal RF with the data signals CH1 through CHn recovered by the demodulators 43-1 through 43-*n* and the low-pass filters 44-1 through 44-*n* to generate re-modulated RF signals CH1 through CHn, respectively. In this example, each of the modulators 46-1 through 46-*n* includes a phase circuit 46*p*, mixers 46*i* and 46*q*, and a combiner 46*c*. In this case, the phase circuit 46*p* generates a pair of oscillator signals from the oscillator signal RF generated by the oscillator 45. Phases of the pair of oscillator signals are different from each other by 90 degrees. The mixer 46*i* mixes an I component of the recovered data signal with one of the pair of the oscillator signals to generate an I component of the re-modulated signal. Similarly, the mixer 46*q* mixes a Q component of the recovered data signal with the other of the pair of the oscillator signals to generate a Q component of the re-modulated signal. The combiner 46*c* combines the I component and the Q component to generate the re-modulated RF signal.

The amplifiers 47-1 through 47-*n* respectively amplify the RF signals CH1 through CHn. In this example, each of the amplifiers 47-1 through 47-*n* is a high-power amplifier (HPA). The RF signals CH1 through CHn amplified by the amplifiers 47-1 through 47-*n* are respectively guided to the antennas 48-1 through 48-*n*. Thus, the RF signals CH1 through CHn are respectively output via the antennas 48-1 through 48-*n*.

In the remote radio unit 200, the demodulators 43-1 through 43-*n* respectively down-convert a received signal, and the low-pass filters 44-1 through 44-*n* respectively transmit data signals of target channels. Here, the tone signals are allocated at frequencies that are different from the frequencies of the IF signals CH1-CHn. Thus, the low-pass filters 44-1 through 44-*n* can easily remove the tone signals added to the multichannel signal. That is, the remote radio unit 200 can remove the tone signals without deteriorating or distorting a waveform of a data signal of each channel. Then the demodulated data signal is up-converted to a radio frequency and output. Accordingly, the RF signals CH1-CHn output via antennas do not include the tone signals.

Figure 10:
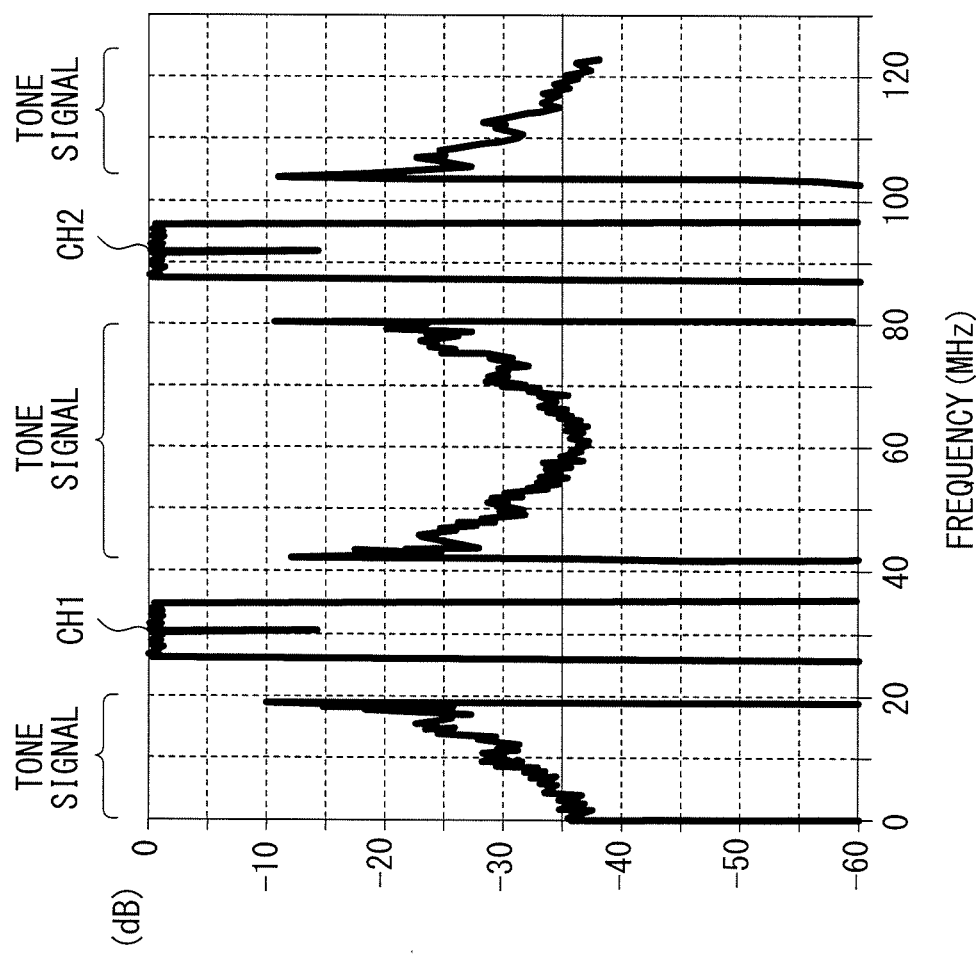
FIG. 10 illustrates an example of a spectrum of a multichannel signal generated in the digital processing unit.

FIG. 10 illustrates an example of a spectrum of a multichannel signal generated in the digital processing unit. In this example, IF signals CH1 and CH2 are multiplexed in a multichannel signal. A frequency spacing between the IF signals CH1 and CH2 is 60 MHz. The horizontal axis represents a frequency offset, and the vertical axis represents an intensity of a signal.

The input multichannel signal is guided to the PAPR reduction circuit 20, as described above. When a power of the input multichannel signal is higher than the threshold level, the tone signals may be added to the multichannel signal in the iteration illustrated in FIG. 2 or FIG. 6. In the example of FIG. 10, a spectrum of the multichannel signal that is obtained after iterations of 12 times is illustrated.

FIG. 11 illustrates a simulation result with respect to a peak-to-average power ratio reduction. The horizontal axis of the graph represents a peak-to-average power ratio (PAPR). The vertical axis represents a complementary cumulative distribution function (CCDF).

The characteristic A represents a PAPR of one IF signal. The characteristics B-D represent a PAPR of a multichannel signal in which two IF signals are multiplexed. Note that the characteristic B represents a PAPR of a multichannel signal in which each IF signal is not clipped. The characteristic C represents a PAPR of a multichannel signal in which each IF signal is clipped with a specified power level. The characteristic D represents a PAPR of a multichannel signal in which each IF signal is clipped with a specified power level and then iteration is performed on the multichannel signal by the PAPR reduction circuit 20. The iteration is performed 12 times. In this simulation, when comparing the characteristics C and D, the PAPR is improved about 0.5 dB at CCDF=$10^{-6}$ by the PAPR reduction circuit 20.

As described above, according to the configuration of the embodiments of the invention, a peak-to-average power ratio of a multichannel signal is reduced. In addition, tone signals used for reducing a power of the multichannel signal are allocated at frequencies other than a frequency of each IF signal multiplexed in the multichannel signal. Thus, the tone signals do not affect each IF signal, and the tone signals can be easily removed at a receiver. Therefore, a quality of each of the IF signals is not deteriorated by the tone signals. For example, even when the tone signals are added to the multichannel signal, an error vector magnitude (EVM) and an adjacent channel leakage ratio (ACLR) of each IF signal are not deteriorated.

Figure 12:
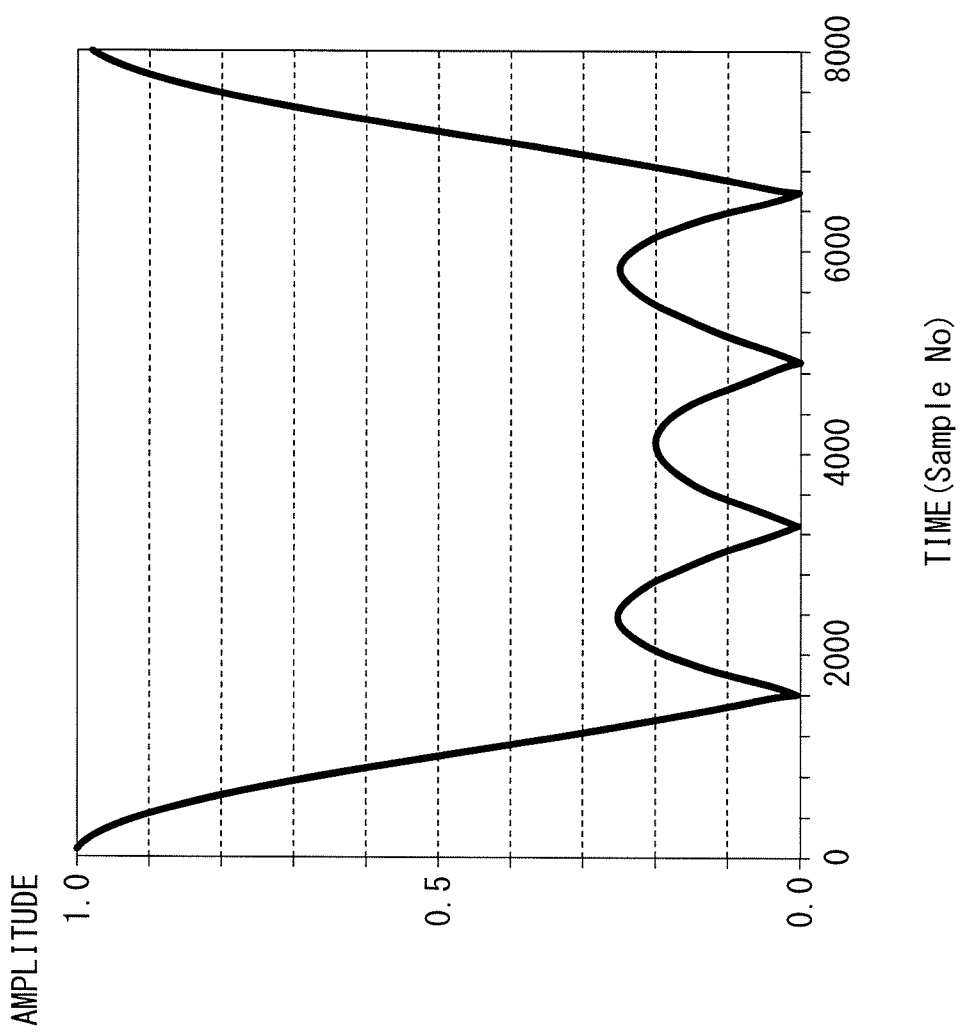
FIG. 12 illustrates an example of a change in amplitude of a tone signal with respect to time.

FIG. 12 illustrates an example of a change in amplitude of atone signal with respect to time. In this example, five tone signals are used. An amplitude of the tone signals is adjusted in the iteration according to a difference between a power of the input multichannel signal and the threshold level. For example, when the power of the input multichannel signal is higher than the threshold level and the difference between the power of the input multichannel signal and the threshold level is large, the amplitude of the tone signals is large.

Allocation of IF Signals and a Tone Signal

As described above, in a communication system that transmits a multichannel signal in which a plurality of data signals are multiplexed, a peak-to-average power ratio (PAPR) can be reduced without deteriorating a quality of the data signals by using a tone signal. In the description below, an allocation of a tone signal for effectively reducing the PAPR will be explained. However, depending on the allocation of the data signals, the PAPR may not be reduced by using the tone signal. Thus, the allocation of the data signals will also be discussed below.

Figure 13A:
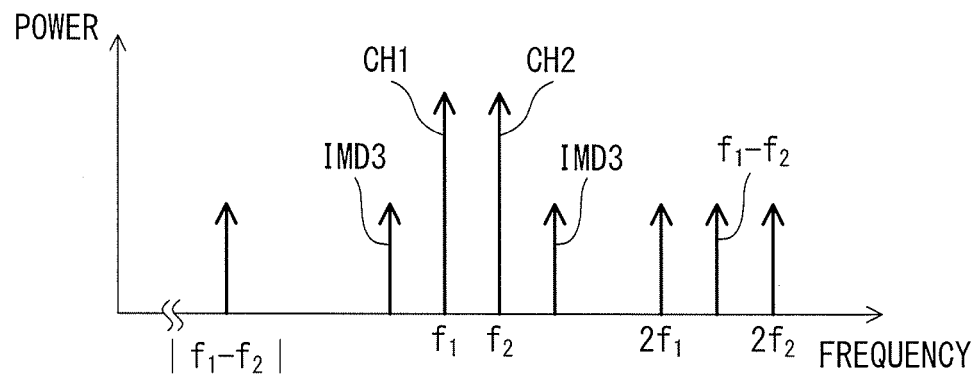
FIGS. 13A and 13B are diagrams explaining inter-modulation distortion of a multichannel signal.
Figure 13B:
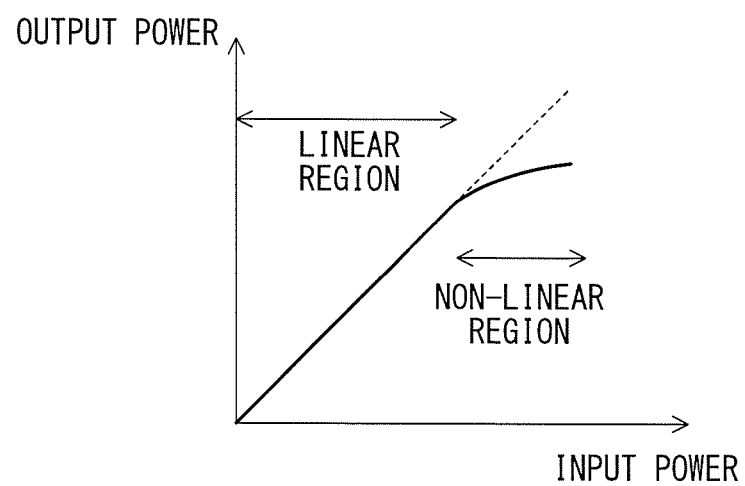

FIGS. 13A and 13B are diagrams explaining inter-modulation distortion of a multichannel signal. In this example, a multichannel signal that includes IF signals CH1 and CH2 illustrated in FIG. 13A is transmitted. Frequencies of the IF signals CH1 and CH2 are $f_1$ and $f_2$, respectively.

In one example, the IF signals CH1 and CH2 are transmitted from the digital processing unit 500 illustrated in FIG. 2 to a remote radio unit. In this case, the IF signals CH1 and CH2 are combined by the combiner 3 and converted into an optical signal by the E/O converter circuit 4.

When a power of an input signal (that is, combined IF signals CH1 and CH2) of the E/O converter circuit 4 is smaller than a specified threshold, as illustrated in FIG. 13B, a power of the output signal is proportional to the power of the input signal. In this case, the inter-modulation distortion (IMD) is not generated of it is small.

However, when the power of the input signal is large, the inter-modulation distortion may be generated. That is, when the power of the input signal increases up to a nonlinear region, the inter-modulation distortion is generated as illustrated in FIG. 13A. In the description below, n-th order inter-modulation distortion may be referred to as "IMDn". For example, IMD3 represents a third order inter-modulation distortion.

When frequencies of the IF signals CH1 and CH2 are $f_1$ and $f_2$, respectively, frequencies of IMD3 are $|2f_1-f_2|$ and $|2f_2-f_1|$. Here, when a receiver (for example, a remote radio unit) receives a signal, it is preferable that IMD3 be suppressed or removed. Thus, the digital processing unit 500 processes an input signal so as to suppress the IMD3 by using the PAPR reduction circuit 20. Here, the PAPR reduction circuit 20 subtracts a frequency component of a tone signal from the input signal. Therefore, if the tone signal is allocated at a frequency of the IMD3, the IMD3 is suppressed by the PAPR reduction circuit 20. That is to say, if the PAPR reduction circuit 20 processes the input signal using a tone signal at a frequency of $|2f_1-f_2|$ and a tone signal at a frequency of $|2f_2-f_1|$, a multichannel signal in which the IMD3 is suppressed is generated.

When the power of the input signal is large, a second order inter-modulation distortion may be generated. The second order inter-modulation distortion is generated at frequencies of $|f_1-f_2|$, $2f_1$, $f_1+f_2$ and $2f_2$ as illustrated in FIG. 13A. However, the frequencies of the second order inter-modulation distortion are generally far away from that of a main signal (the IF signals CH1 and CH2). In other words, the second order inter-modulation distortion may be removed easily by using a band-pass filter in the receiver. Thus, it is not necessary for the digital processing unit 500 to generate a tone signal for suppressing the second order distortion components.

In addition, when the power of the input signal is large, a fourth or higher order distortion may be generated. However, the fourth or higher order distortion components are much smaller than IMD3. Thus, it is not necessary for the digital processing unit 500 to generate a tone signal for suppressing the fourth or higher order distortion components. Note that the digital processing unit 500 may generate a tone signal for suppressing the fourth or higher order distortion components.

However, there is a case where the tone signal cannot be allocated at a frequency of the IMD3 depending on an allocation of the IF signals multiplexed in a multichannel signal. For example, it is assumed that a multichannel signal that includes main signals F1-F3 illustrated in FIG. 14A is transmitted. In this example, it is assumed that a frequency of the main signal F2 is two times a frequency of the main signal F1, and a frequency of the main signal F3 is three times a frequency of the main signal F1. That is, 2F1=F2 and 3F1=F3. In this case, six IMD3 components (IMD3_A through IMD3_F) are generated. The frequencies of the IMD3 components are as follows.

IMD3_A: $2F1-F3$

IMD3_B: $2F1-F2$

IMD3_C: $2F2-F3$

IMD3_D: $2F2-F1$

IMD3_E: $2F3-F2$

IMD3_F: $2F3-F1$

If tone signals are respectively allocated at frequencies of the IMD3 components in the PAPR reduction circuit 20, these IMD3 components may be suppressed. However, the frequency of the IMD3_C is the same as the frequency of the main signal F1, and the frequency of the IMD3_D is the same as the frequency of the main signal F3. Thus, if a tone signal for suppressing the IMD3_C is generated, not only the IMD3_C but also the main signal F1 is suppressed. Similarly, if a tone signal for suppressing the IMD3_D is generated, not only the IMD3_C but also the main signal F3 is suppressed.

Figure 15:
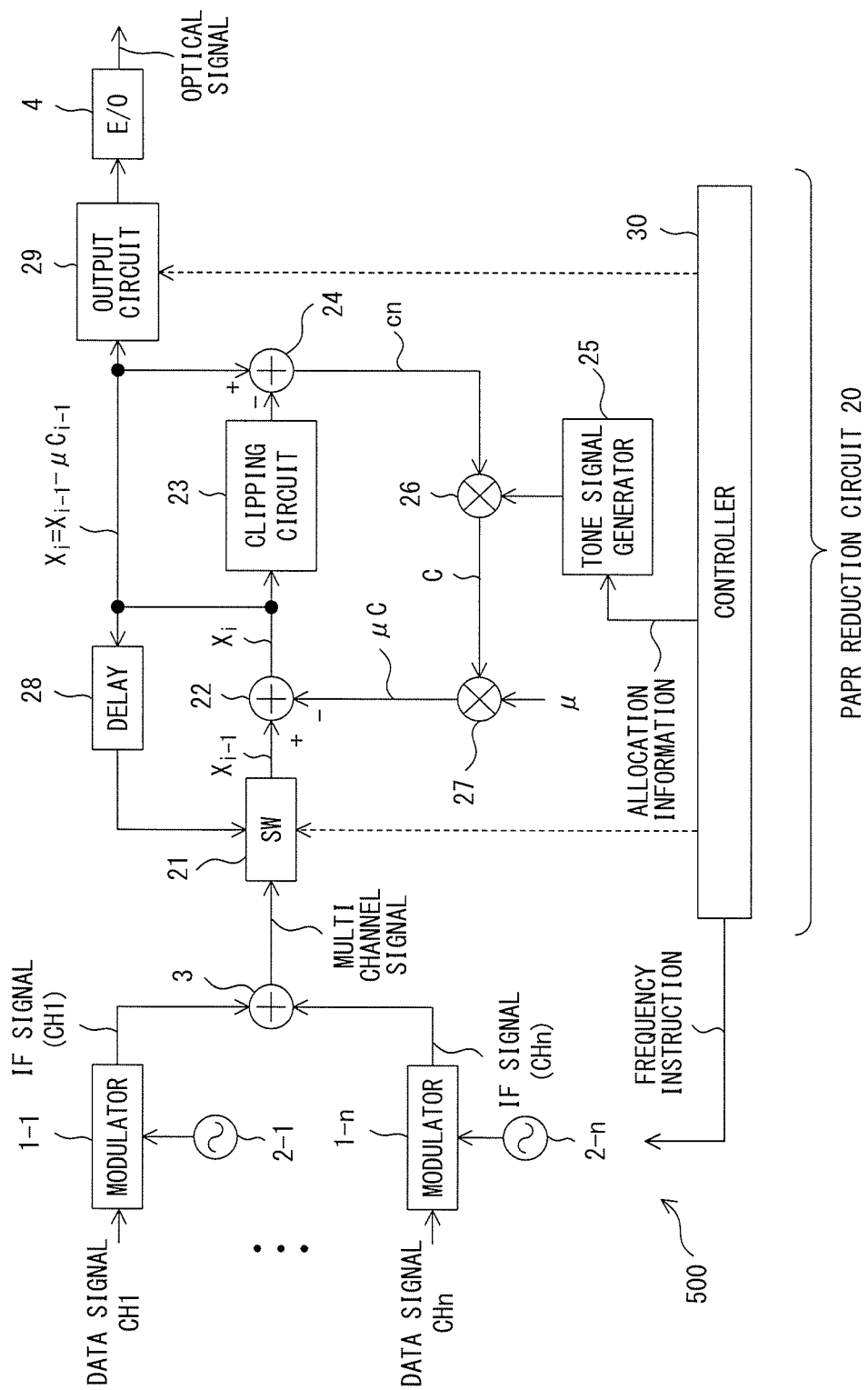
FIG. 15 illustrates an example of a digital processing unit according to another embodiment.

Accordingly, as illustrated in FIG. 15, the digital processing unit 500 has a function to control oscillation frequencies of the oscillator 2-1 through 2-n and a function to control frequencies of the tone signals. These functions may be implemented by the controller 30. Note that the oscillation frequencies of the oscillator 2-1 through 2-n and the frequencies of the tone signals may be controlled before data communication starts.

Figure 16:
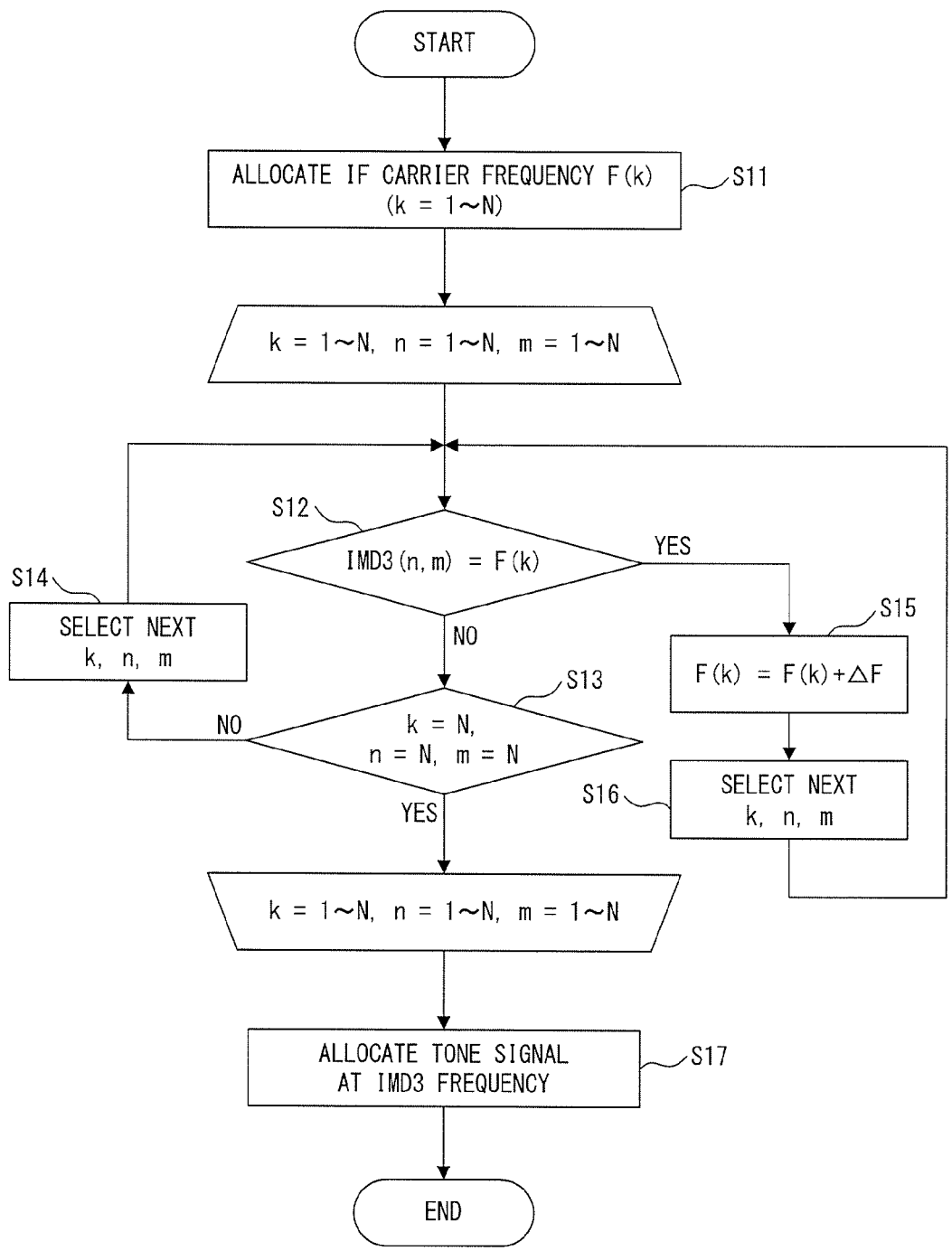
FIG. 16 illustrates an example of a process to determine an allocation of IF signals and tone signals.

FIG. 16 illustrates an example of a process to determine an allocation of IF signals and tone signals. In this example, a multichannel signal that includes N IF signals is transmitted. N is an integer that is larger than two. The process in the flowchart of FIG. 16 may be executed within the digital processing unit 500 and may be executed by a computer that is connected to the digital processing unit 500. In the description below, the process in the flowchart of FIG. 16 is executed by the controller 30.

In S11, the controller 30 determines respective frequencies F(k) of N IF carriers that are used in data transmission. The N IF carriers are allocated, for example, at constant frequency spacing. Then the controller 30 executes the processes in S12-S16 with respect to all combinations of variables k (k=1, 2, . . . , N), n (n=1, 2, . . . , N) and m (m=1, 2, . . . , N).

In S12, the controller 30 compares a frequency of the IMD3(n,m) with an IF carrier frequency F(k). The frequency of the IMD3(n,m) is expressed by the formula below. Note that n and m are not the same as each other.

$$IMD3(n,m)=2F(n)-F(m)$$

When the frequency of the IMD3 (n,m) is different from the IF carrier frequency F(k), in S13, the controller 30 decides whether the processes in S12-S16 have been executed with respect to all combinations of variables k, n and m. When the processes in S12-S16 have not been executed with respect to one or more combinations, in S14, the controller 30 selects a next combination. Then the process of the controller 30 is returned to S12.

When the frequency of the IMD3(n,m) is the same as the IF carrier frequency F(k), in S15, the controller 30 shifts the IF carrier frequency F(k) by ΔF. It is preferable that ΔF be sufficiently small compared with a frequency spacing of IF signals. In addition, it is preferable that ΔF be determined such that a frequency component F(k)+ΔF can be sufficiently removed by a filter (LPF 44-1 through 44-n in FIG. 8) in a receiver when a frequency component F(k) passes through the filter. In S16, the controller 30 selects a next combination. Then the process of the controller 30 is returned to S12.

After the processes in S12-S16 have been executed with respect to all combinations, in S17, the controller 30 determines an allocation of the tone signals. For example, the tone signals are allocated at respective frequencies of IMD3.

The process in the flowchart of FIG. 16 will be explained in accordance with the example illustrated in FIGS. 14A and 14B. In this example, it is assumed that IF carrier frequencies F(1), F(2) and F(3) are determined in S11 as follows.

$$F(1)=60\text{ MHz}$$

$$F(2)=120\text{ MHz}$$

$$F(3)=180\text{ MHz}$$

When k=3, n=3 and m=1, the calculation below is executed in S12.

$$F(k=3)=180\text{ MHz}$$

$$IMD3(3,1)=360\text{ MHz}-60\text{ MHz}=300\text{ MHz}$$

In this case, the IF carrier frequency F(3) is not the same as the frequency of the IMD3(3,1). Thus, the controller 30 does not change the IF carrier frequency F(3).

When k=3, n=3 and m=2, the calculation below is executed in S12.

$$F(k=3)=180\text{ MHz}$$

$$IMD3(3,2)=360\text{ MHz}-120\text{ MHz}=240\text{ MHz}$$

In this case, the IF carrier frequency F(3) is not the same as the frequency of the IMD3(3,2). Thus, the controller 30 does not change the IF carrier frequency F(3).

When k=3, n=2 and m=1, the calculation below is executed in S12.

$$F(k=3)=180\text{ MHz}$$

$$IMD3(2,1)=240\text{ MHz}-60\text{ MHz}=180\text{ MHz}$$

In this case, the IF carrier frequency F(3) is the same as the frequency of the IMD3(2,1). Thus, the controller 30 shifts the IF carrier frequency F(3) by ΔF. In this example, ΔF is 30 MHz. Therefore, the IF carrier frequencies F(1), F(2) and F(3) are reallocated as follows.

$$F(1)=60\text{ MHz}$$

$$F(2)=120\text{ MHz}$$

$$F(3)=210\text{ MHz}$$

After the IF carrier frequencies F(1), F(2) and F(3) are reallocated, as illustrated in FIG. 14B, each frequency of the IF carrier does not match any IMD3 components. Thus, the process of the controller 30 is moved to S17. In S17, tone signals are assigned to respective IMD3 components.

Then, the controller 30 gives a frequency instruction to the oscillators 2-1 through 2-n. This frequency instruction controls oscillation frequencies of the oscillators 2-1 through 2-n. In this example, frequencies of three oscillators selected from the oscillators 2-1 through 2-n are controlled to be 60 MHz, 120 MHz and 210 MHz.

In addition, the controller 30 gives allocation information to the tone signal generator 25. The allocation information indicates an allocation of the tone signals. In this example, the allocation information that indicates six tone signals respectively corresponding to the IMD3_A through IMD3_F illustrated in FIG. 14B is given to the tone signal generator 25.

The PAPR reduction circuit 20 processes the input signal according to the setting described above. During the process in the PAPR reduction circuit 20, when the power of the input signal is higher than a threshold of the clipping circuit 23, tone signal components are subtracted from the input signal. As a result, each IMD3 component is suppressed during the process of reducing the PAPR of the input signal.

FIGS. 17A through 18O illustrate an example of another method for allocating IF signals and tone signals. In this example, a multichannel signal that includes two IF signals Ch1 and Ch2 is transmitted. A frequency difference between the IF signals Ch1 and Ch2 is Fs/2 as illustrated in FIG. 17A. The frequency Fs indicates a sampling frequency of the digital processing unit 500. An arrow with a broken line indicates a tone signal.

When the input power of the multichannel signal is higher than a threshold level, as described above, IMD3 is generated. It is assumed that the IMD3 components overlap the IF signals Ch1 and Ch2 as illustrated in FIG. 17B. In this case, the PAPR reduction circuit 20 does not suppress the IMD3 components by using tone signals. In other words, the PAPR reduction circuit 20 shifts carrier frequencies of the IF signals Ch1 and Ch2 such that the PAPR reduction circuit 20 can suppress the IMD3 components by using tone signals.

In this example, the sampling frequency Fs is 30.72 MHz. That is, a difference in carrier frequencies between the IF signals Ch1 and Ch2 is 61.44 MHz. Note that tone signals are allocated approximately intermediately between the IF signals Ch1 and Ch2.

As illustrated in FIGS. 18A-18C, when a frequency spacing between the IF signals Ch1 and Ch2 becomes wider, the frequencies of the IMD3 components approach the intermediate frequency of the IF signals Ch1 and Ch2. That is, when a frequency spacing between the IF signals Ch1 and Ch2 becomes wider, the frequencies of the IMD3 components approach the frequencies of the tone signals. Here, when a frequency of the IMD3 component is the same or approximately the same as a frequency of the tone signal, the IMD3 component is suppressed by the PAPR reduction circuit 20. Thus, the PAPR reduction circuit 20 determines the frequencies of the IF signals Ch1 and Ch2 such that frequencies of the IMD3 components are approximately the same as frequencies of the tone signals. In this example, as illustrated in FIG. 18C, the frequency of the IF signal Ch1 is shifted by approximately −19 MHz, and the frequency of the IF signal Ch2 is shifted by approximately +19 MHz.

Figure 19:
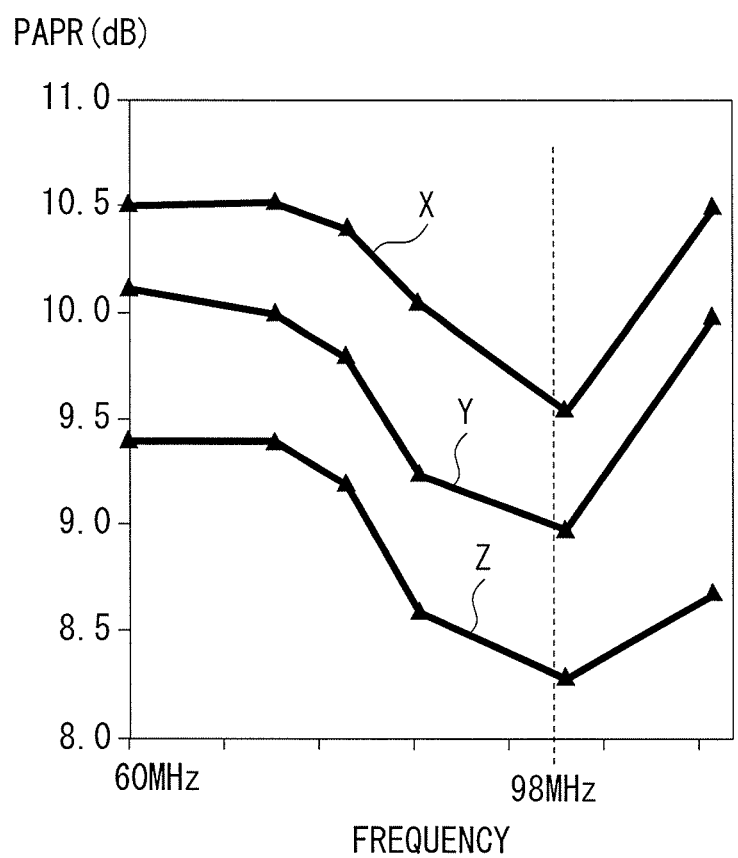
FIG. 19 illustrates an example of a simulation result calculating PAPR with respect to allocation of IF signals.

FIG. 19 illustrates an example of a simulation result calculating PAPR with respect to allocation of IF signals. In this simulation, as illustrated in FIGS. 17A through 18C, tone signals are allocated at an approximately intermediate frequency of the IF signals Ch1 and Ch2. The horizontal axis of a graph in FIG. 19 represents a frequency spacing between the IF signals Ch1 and Ch2. The vertical axis represents a peak-to-average power ratio (PAPR). The characteristics X, Y and Z indicate PAPR at $CCDF=10^{-4}$, $CCDF=10^{-6}$ and $CCDF=10^{-7}$, respectively. CCDF represents a complementary cumulative distribution function.

In this simulation, when the frequency spacing between the IF signals Ch1 and Ch2 is about 100 MHz, the PAPR is minimized. At this point, as illustrated in FIG. 18C, the frequencies of the IMD3 components are close to the frequencies of the tone signals. Accordingly, it is considered that the PAPR is reduced by suppressing the IMD3 components using the tone signals.

According to the embodiments described above, IMD3 components are suppressed; however, the PAPR reduction circuit 20 may suppress fourth or higher order inter-modulation distortion. For example, it is assumed that carrier frequencies of N IF signals included in a multichannel signal are f1 through fN. In this case, inter-modulation distortions are generated at the frequencies below.

$$|K \cdot fn - L \cdot fm|$$

K=2, 4, 6, . . .
L=1, 3, 5, . . .
n: 1 through N
m: 1 through N

Note that when K=2 and L=1, frequencies of IMD3 components are obtained.

The PAPR reduction circuit 20 allocates tone signals at frequencies where inter-modulation distortion components are generated. By doing this, the inter-modulation distortion components are suppressed and thus the PAPR is reduced. At this point, the PAPR reduction circuit 20 does not allocate the tone signal at a carrier frequency of the IF signal. Therefore, when a carrier frequency of the IF signal is the same as a frequency at which the inter-modulation distortion component is generated, the carrier frequency of the IF signal is shifted. When frequencies of the tone signals are fixedly determined in advance, the PAPR reduction circuit 20 may adjust carrier frequencies of the IF signals such that each carrier frequency of the IF signal does not match any frequencies at which the inter-modulation distortion component is generated and each carrier frequency of the IF signal does not match any frequencies of the tone signals. Note that the PAPR reduction circuit 20 may allocate the tone signals only at frequencies where inter-modulation distortion components are generated.

According to the configuration and the method of the embodiments, in a communication system in which a plurality of signals are combined and transmitted from a communication device to a remote device, a deterioration in quality of respective signals is suppressed.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A communication device comprising:
   a signal generator configured to generate a plurality of intermediate frequency signals;
   a combiner configured to combine the plurality of intermediate frequency signals to generate a multichannel signal;
   a reduction unit configured to reduce a peak-to-average power ratio of the multichannel signal; and
   a converter configured to convert the multichannel signal whose peak-to-average power ratio is reduced by the reduction unit into an optical signal, wherein:
   the reduction unit is configured to reduce a power of the multichannel signal using supplemental signals, frequencies of the supplemental signals being different from frequencies of the intermediate frequency signals, when the power of the multichannel signal is higher than a specified threshold level; and
   when the multichannel signal includes a first intermediate frequency signal of a first carrier frequency and a second intermediate frequency signal of a second carrier frequency, the supplemental signals are allocated at frequencies between the first carrier frequency and the second carrier frequency.

2. The communication device according to claim 1, wherein the reduction unit is further configured to reduce the power of the multichannel signal by subtracting the supplemental signals from the multichannel signal in a frequency domain when the power of the multichannel signal is higher than the specified threshold level.

3. The communication device according to claim 1, wherein the reduction unit is further configured to gradually reduce the power of the multichannel signal to the specified threshold level by repeatedly executing an iteration to reduce the power of the multichannel signal using the supplemental signals, when the power of the multichannel signal is higher than the specified threshold level.

4. The communication device according to claim 1, wherein the reduction unit is further configured to control an amplitude of the supplemental signals based on a difference between the power of the multichannel signal and the specified threshold level.

5. The communication device according to claim 1, wherein the reduction unit is further configured to include:
   a supplemental signal generator configured to generate the supplemental signals;
   a difference calculator configured to calculate a difference between the power of the multichannel signal and the threshold level;
   a multiplier configured to multiply the supplemental signals by the difference; and
   a subtractor configured to calculate a new multichannel signal obtained by subtracting the output signal of the multiplier from the multichannel signal and output the new multichannel signal to the difference calculator, wherein the difference calculator, the multiplier and the subtractor reduce the power of the multichannel signal by repeatedly executing an iteration to subtract the output signal of the multiplier from the multichannel signal a specified number of times, when the power of the multichannel signal is higher than the threshold level.

6. A communication device comprising:
a signal generator configured to generate a plurality of intermediate frequency signals;
a combiner configured to combine the plurality of intermediate frequency signals to generate a multichannel signal;
a reduction unit configured to reduce a peak-to-average power ratio of the multichannel signal; and
a converter configured to convert the multichannel signal whose peak-to-average power ratio is reduced by the reduction unit into an optical signal, wherein:
the reduction unit is configured to reduce a power of the multichannel signal using supplemental signals, frequencies of the supplemental signals being different from frequencies of the intermediate frequency signals, when the power of the multichannel signal is higher than a specified threshold level; and
when the multichannel signal includes a first intermediate frequency signal of a first carrier frequency and a second intermediate frequency signal of a second carrier frequency, the second carrier frequency being higher than the first carrier signal, the supplemental signals are allocated at frequencies lower than the first carrier frequency, at frequencies between the first carrier frequency and the second carrier frequency, and at frequencies higher than the second carrier frequency.

7. A communication device comprising:
a signal generator configured to generate a plurality of intermediate frequency signals;
a combiner configured to combine the plurality of intermediate frequency signals to generate a multichannel signal;
a reduction unit configured to reduce a peak-to-average power ratio of the multichannel signal; and
a converter configured to convert the multichannel signal whose peak-to-average power ratio is reduced by the reduction unit into an optical signal, wherein:
the reduction unit is further configured to reduce a power of the multichannel signal using supplemental signals, frequencies of the supplemental signals being different from frequencies of the intermediate frequency signals, when the power of the multichannel signal is higher than a specified threshold level,
the signal generator is configured to adjust carrier frequencies of the intermediate frequency signals such that frequencies of the inter-modulation distortion components of the intermediate frequency signals do not match any carrier frequencies of the intermediate frequency signals, and
the reduction unit is configured to allocate the supplemental signals at the frequencies of the inter-modulation distortion components.

8. The communication device according to claim 7, wherein the reduction unit is further configured to allocate the supplemental signals such that the frequencies of the supplemental signals do not match any carrier frequencies of the intermediate frequency signals.

9. A communication system that includes a communication device and a remote device that receives an optical signal generated by the communication device, wherein:
the communication device includes:
a signal generator configured to generate a plurality of intermediate frequency signals from a plurality of baseband signals;
a combiner configured to combine the plurality of intermediate frequency signals to generate a multichannel signal;
a reduction unit configured to reduce a peak-to-average power ratio of the multichannel signal; and
an Electrical-to-Optical (E/O) converter configured to convert the multichannel signal whose peak-to-average power ratio is reduced by the reduction unit into an optical signal,
wherein:
the reduction unit is further configured to reduce a power of the multichannel signal using supplemental signals, frequencies of the supplemental signals being different from frequencies of the intermediate frequency signals, when the power of the multichannel signal is higher than a specified threshold level, and
when the multichannel signal includes a first intermediate frequency signal of a first carrier frequency and a second intermediate frequency signal of a second carrier frequency, the supplemental signals are allocated at frequencies between the first carrier frequency and the second carrier frequency, and wherein the remote device includes:
an Optical-to-Electrical (O/E) converter configured to convert the optical signal into an electric signal;
a demodulator configured to recover the plurality of baseband signals from the electric signal;
a plurality of filters respectively configured to remove frequency components of the supplemental signals from the plurality of baseband signals recovered by the demodulator; and
an up-converter configured to up-convert the plurality of baseband signals output from the filters to generate a plurality of radio frequency signals.

10. A transmission method comprising:
generating a plurality of intermediate frequency signals;
combining the plurality of intermediate frequency signals to generate a multichannel signal;
reducing a power of the multichannel signal using supplemental signals, frequencies of the supplemental signals being different from frequencies of the intermediate frequency signals, when the power of the multichannel signal is higher than a specified threshold level;
converting the multichannel signal whose power is reduced into an optical signal; and
transmitting the optical signal to a remote device, wherein when the multichannel signal includes a first intermediate frequency signal of a first carrier frequency and a second intermediate frequency signal of a second carrier frequency, the supplemental signals are allocated at frequencies between the first carrier frequency and the second carrier frequency.

* * * * *